United States Patent
Yamasaki et al.

(10) Patent No.: US 7,232,227 B2
(45) Date of Patent: Jun. 19, 2007

(54) IMAGE DISPLAY DEVICE

(75) Inventors: Futoshi Yamasaki, Yokohama (JP);
Nobuo Masuoka, Chigasaki (JP);
Masahiko Yatsu, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 179 days.

(21) Appl. No.: 11/061,663

(22) Filed: Feb. 22, 2005

(65) Prior Publication Data
US 2005/0280783 A1 Dec. 22, 2005

(30) Foreign Application Priority Data
Jun. 18, 2004 (JP) ............................ 2004-180438

(51) Int. Cl.
| G03B 21/26 | (2006.01) |
| G03B 21/20 | (2006.01) |
| G02B 27/10 | (2006.01) |
| G02F 1/00 | (2006.01) |
| G02F 1/1335 | (2006.01) |
| H04N 5/74 | (2006.01) |
| F21V 7/04 | (2006.01) |
| H01L 33/00 | (2006.01) |

(52) U.S. Cl. ................. 353/94; 353/31; 353/34; 353/82; 353/102; 359/623; 348/750; 348/758; 348/759; 362/555; 362/561; 362/612; 362/613; 362/227; 362/800

(58) Field of Classification Search ............... 353/94, 353/30, 31, 33, 34, 37, 81, 82, 98, 99, 102; 349/5, 7, 8, 95; 359/34, 618–623, 629, 636, 359/638–640, 641; 348/739, 742, 744, 750, 348/751, 757–761, 771; 362/555, 561, 611–613, 362/227, 800
See application file for complete search history.

(56) References Cited

U.S. PATENT DOCUMENTS
7,090,357 B2 * 8/2006 Magarill et al. ............... 353/94

FOREIGN PATENT DOCUMENTS
JP      2003-280094      10/2003

* cited by examiner

*Primary Examiner*—W. B. Perkey
*Assistant Examiner*—Rochelle Blackman
(74) *Attorney, Agent, or Firm*—Antonelli, Terry, Stout & Kraus, LLP.

(57) ABSTRACT

The image display device is configured to include the light source including a plurality of semiconductor light-emitting elements, a parallelizing unit including a plurality of cell lenses arranged in a one-to-one correspondence with each of the plurality of semiconductor light-emitting elements, an image display element for forming an optical image, a pair of lens-array groups located between the parallelizing unit and the image display element, and a projection unit for enlarging and projecting the optical image formed on the image display element. Moreover, the plurality of semiconductor light-emitting elements are located at substantially focal points of the cell lenses of the parallelizing unit. Furthermore, there exist at least two types of semiconductor light-emitting elements' groups, light beams on optical axes of the semiconductor light-emitting elements belonging to the two types of semiconductor light-emitting elements' groups existing on straight lines which are different from optical axes of the lens-array groups.

19 Claims, 15 Drawing Sheets

OPTICAL-OUTPUT RELATIVE VALUE

IMAGE DISPLAY DEVICE

INCORPORATION BY REFERENCE

The present application claims priority from Japanese application JP2004-180438 filed on Jun. 18, 2004, the content of which is hereby incorporated by reference into this application.

BACKGROUND OF THE INVENTION

1. Field of the Invention

The present invention relates to an image display device for illuminating an image display element, such as transparent-type liquid crystal, reflection-type liquid crystal, or DMD (micro mirror), by using light emitted from a light-source unit, and for enlarging and projecting an optical image formed on the image display element. Here, the light-source unit is configured by arranging a plurality of light sources such as LEDs which are semiconductor light-emitting elements.

2. Description of the Related Art

There has been known an image display device for illuminating an image display element, such as transparent-type liquid crystal, reflection-type liquid crystal, or DMD, by using light emitted from a light source, and for enlarging and projecting an optical image formed on the image display element.

As a trend in recent times, a study has been made concerning an image display device which employs, as the light source, the so-called LED elements such as light-emitting diodes which are semiconductor light-emitting elements or organic EL.

As a prior art, the following technology has been disclosed in JP-A-2003-280094: Namely, pitch of parallelizing elements of a parallelizing unit and pitch of element lenses of lens-array bodies in an integrator optical system are set such that both of the pitches will not coincide with each other. This setting allows uniformity of the illuminance on an illuminated body to be implemented with no coincidence established between centers of the parallelizing elements and optical axes of the element lenses.

SUMMARY OF THE INVENTION

In general, boundary portions in a lens array have an acute angle. As a result, curvature is formed at the boundary portions when the lens array is manufactured. Moreover, the boundary portions exhibit none of the functions as lenses.

In the technology disclosed in JP-A-2003-280094, one semiconductor light-emitting element is not located in a one-to-one correspondence with one lens-array cell. As a result, light-emitting centers of a part of the semiconductor light-emitting elements are located at boundary portions of the cell lenses. This results in a problem that utilization efficiency of lights will be reduced.

The present invention has been devised in view of the above-described circumstances. Accordingly, an object thereof is to provide an image display device which allows an enhancement in utilization efficiency of lights.

In order to accomplish the above-described object, the image display device according to the present invention is configured to include the following configuration components: A light source including a plurality of semiconductor light-emitting elements, a parallelizing unit including a plurality of cell lenses arranged in a one-to-one correspondence with each of the plurality of semiconductor light-emitting elements, an image display element for forming an optical image, a pair of lens-array groups located between the parallelizing unit and the image display element (a first lens array on the side of the parallelizing unit and a second lens array on the side of the image display element), and a projection unit for enlarging and projecting the optical image formed on the image display element. Moreover, the plurality of semiconductor light-emitting elements are located at substantially focal points of the cell lenses of the parallelizing unit. Furthermore, there exist at least two types of semiconductor light-emitting elements' groups, light beams on optical axes of the semiconductor light-emitting elements belonging to the two types of semiconductor light-emitting elements' groups existing on straight lines which are different from optical axes of the lens-array groups.

According to the present invention, it becomes possible to provide the image display device which allows an enhancement in utilization efficiency of the lights.

Other objects, features and advantages of the invention will become apparent from the following description of the embodiments of the invention taken in conjunction with the accompanying drawings.

DETAILED DESCRIPTION OF THE INVENTION

Figure 1:
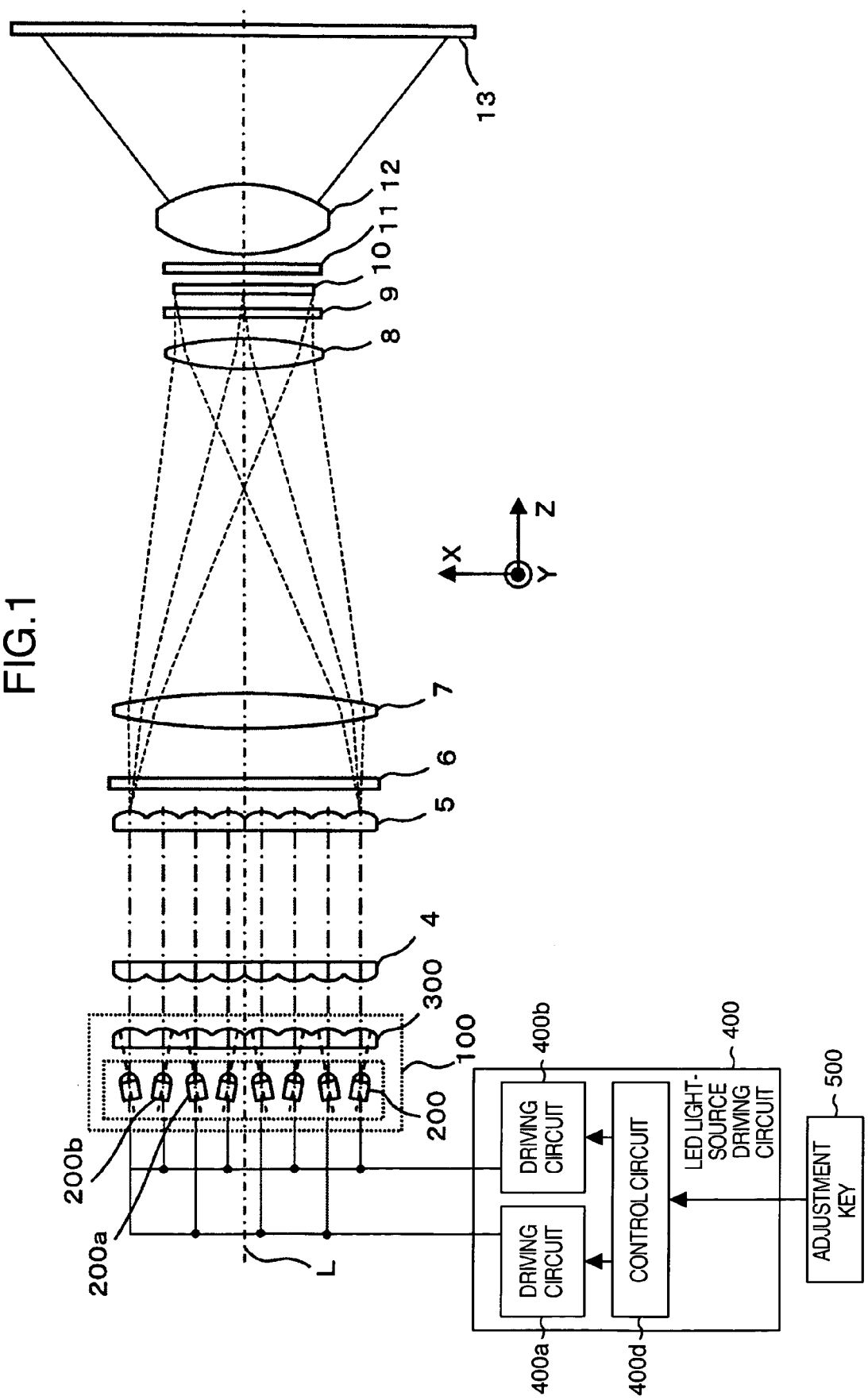
FIG. 1 is a schematic configuration diagram of an image display device of a first embodiment according to the present invention.

Hereinafter, referring to the drawings, the detailed explanation will be given below concerning embodiments of the present invention. Incidentally, in the respective drawings, configuration components having the same functions are denoted by attaching the same reference numerals.

Additionally, in the present embodiments, the explanation will be given below concerning a case where a transparent-type liquid-crystal panel is applied as the image display element. It is needless to say, however, that the present invention is also applicable in such an image display element as a reflection-type liquid-crystal panel or a DMD panel.

[First Embodiment]

FIG. 1 is a schematic configuration diagram acquired by seeing from above an image display device which is a first embodiment according to the present invention.

In FIG. 1, a reference numeral 100 denotes a light-source unit. The light-source unit 100 is configured by a LED light source 200 including a plurality of LED elements for emitting monochromatic light, and a collimator lens (i.e., parallelizing unit) 300 for parallelizing the light from the LED light source 200. Numerals 4 and 5 respectively denote a first lens array and a second lens array which configure an integrator optical system. Numerals 6, 7, 8, 9, 10, 11, 12, and 13 denote a polarization conversion element, a light-converging lens, a condenser lens, an incoming-side sheet polarizer, a transparent-type liquid-crystal panel which is an image display element, an outgoing-side sheet polarizer, a projection lens, and a screen, respectively. A numeral 400 denotes a LED light-source driving circuit for light-up driving the LED light source 200. A reference notation L denotes the optical axis of an illumination optical system. Also, as main components other than these, although not illustrated, there exist such components as an image-signal driving circuit and a power-supply circuit.

Incidentally, for the sake of convenience of the explanation hereinafter, a Cartesian coordinate system will be introduced. In FIG. 1, the direction of the optical axis L is defined as Z-axis direction. Moreover, the direction which is parallel to the drawing's paper surface within XY plane perpendicular to the Z-axis direction is defined as X-axis direction, and the direction perpendicular to the X axis and extending from rear side of the drawing's paper surface to front side thereof is defined as Y-axis direction. Also, it is assumed that the X-axis direction is parallel to longer-side direction of the rectangle-shaped liquid-crystal panel 10, and that the Y-axis direction is parallel to shorter-side direction of the liquid-crystal panel 10.

First, the explanation will be given below concerning the light-source unit 100. The light-source unit 100 is configured by the LED light source 200 including the plurality of LED elements arranged in an array-like manner ($m_1$ row×$n_1$ column) and emitting monochromatic light, and the collimator lens 300 including a plurality of rectangle-shaped cell lenses which are similarly arranged in an array-like manner ($m_1$ row×$n_1$ column). The respective LED elements which are the elements of the LED light source 200 and the respective cell lenses of the collimator lens 300 are in a one-to-one correspondence with each other.

The respective LED elements of the LED light source 200 intersect with optical axes of the corresponding respective cell lenses of the collimator lens 300 at two types of predetermined angles (these angles are substantially symmetric to each other with reference to the optical axes of the cell lenses of the collimator lens 300). Of these LED elements, reference numeral of the LED elements oriented in positive direction (hereinafter, this direction will be referred to as "left") of the X-axis direction (longer-side direction) is defined as 200a, and reference numeral of the LED elements oriented in negative direction (hereinafter, this direction will be referred to as "right") of the X-axis direction (longer-side direction) is defined as 200b. The LED elements 200a and the LED elements 200b are substantially equal in number. The respective LED elements 200a are connected to each other, and are driven by a driving circuit 400a of the LED light-source driving circuit 400. Similarly, the respective LED elements 200b are connected to each other, and are driven independently of the LED elements 200a by a driving circuit 400b of the LED light-source driving circuit 400.

Incidentally, reference numeral 400d in the LED light-source driving circuit 400 denotes a control circuit for controlling the driving circuits 400a and 400b. Based on an operation input via an adjustment key 500 which is operable from the outside, the control circuit 400d controls the driving circuits 400a and 400b so that brightness of group of the LED elements 200a and that of group of the LED elements 200b are made variable independently of each other. In accordance with the control from the control circuit 400d, the driving circuits 400a and 400b make conditions, e.g., driving currents for the LED elements, applied voltages thereto, or driving times therefor, variable so that the brightness will be varied.

Each of the cell lenses of the collimator lens 300 is a planar-convex lens which has a convex surface on one side and a planar surface on the other side. The respective cell lenses are located such that light-emitting centers of the respective LED elements are positioned at substantially focal points of the respective cell lenses. Based on the implementation of the location like this, lights outgoing from the respective LED elements of the LED light source 200 are converted into substantially parallel lights by the corresponding respective cell lenses of the collimator lens 300. Consequently, lights outgoing from the light-source unit 100 turn out to become the substantially parallel lights.

Additionally, although, in FIG. 1, the planar surfaces of the cell lenses are oriented onto the light-source side, the cell lenses may also be located such that, on the contrary, the convex surfaces are oriented onto the light-source side. Otherwise, each cell lens may be a both-convex lens which has a convex surface on both sides. Also, the collimator lens need not be of integral type, but may be an assembly of small lenses which are $m_1 \times n_1$ in number.

Next, the explanation will be given below concerning the integrator optical system. The first lens array 4 and the second lens array 5, which configure the integrator optical system, include a plurality of rectangle-shaped cell lenses arranged in an array-like manner ($m_1$ row×$n_1$ column). Here, each of the cell lenses is a planar-convex lens which has a convex surface on one side and a planar surface on the other side. Namely, the respective cell lenses of the first lens array 4 and those of the second lens array 5 are in a one-to-one correspondence with the respective LED elements.

Figure 2:
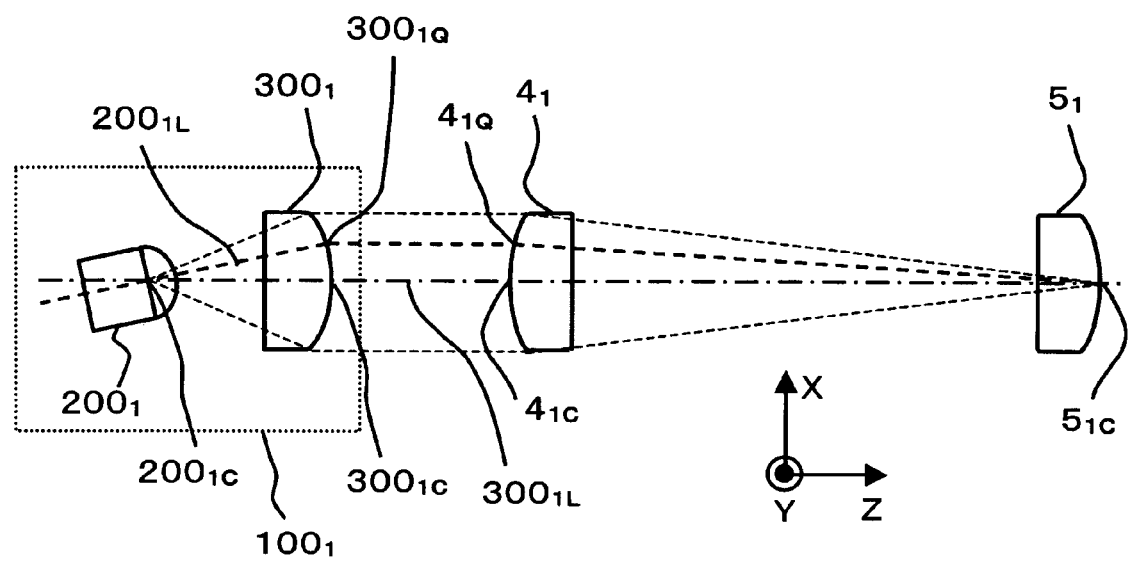
FIG. 2 is a partially enlarged view of a portion acquired by extracting one set of components ranging from a LED element to the cell lens of a second lens array.

FIG. 2 is a partially-enlarged detailed view where, of the elements arranged in the $m_1$-row×$n_1$-column array-like manner in the image display device of the present invention illustrated in FIG. 1, a mutually-corresponding arbitrary one set of each LED element of the LED light source 200, each cell lens of the collimator lens 300, each cell lens of the first lens array 4, and each cell lens of the second lens array 5 are extracted and illustrated.

Here, the one set of elements within the $m_1$ row×$n_1$ column are indicated by affixing one and the same subscript thereto. Namely, subscript for the first one set is defined as 1. Accordingly, the LED element of the LED light source 200, the cell lens of the collimator lens 300, the cell lens of the first lens array 4, and the cell lens of the second lens array 5 are denoted by $200_1$, $300_1$, $4_1$, and $5_1$, respectively. Incidentally, numeral 100, denotes an element of the light-source unit 100 including the LED element $200_1$ and the cell lens $300_1$.

As illustrated in FIG. 2, the cell lens $4_1$ of the first lens array 4 and the cell lens $5_1$ of the second lens array 5 are located such that their planar surfaces are opposed to each other. Also, optical axis $300_{1L}$ of the cell lens $300_1$ of the collimator lens 300 is located in such a manner as to pass through both center $4_{1C}$ of the cell lens $4_1$ of the first lens array 4 and center $5_{1C}$ of the cell lens $5_1$ of the second lens array 5. Namely, optical axis of the cell lens $4_1$ of the first lens array 4, optical axis of the cell lens $5_1$ of the second lens array 5, and the optical axis of the cell lens $300_1$ of the collimator lens 300 are located in such a manner as to coincide with each other (hereinafter, for the sake of convenience, optical axis which has resulted from this coincidence will be referred to as "cell-lens optical axis"). As described earlier, the light-emitting center $200_{1C}$ of the LED element $200_1$ is positioned on this cell-lens optical axis $300_{1L}$. Additionally, numeral $300_{1C}$ denotes center of the cell lens $300_1$ of the collimator lens 300.

Also, as illustrated in FIG. 2, optical axis $200_{1L}$ of the LED element $200_1$ is inclined with respect to the optical axis $300_{1L}$ of the cell lens $300_1$ of the collimator lens 300. A light beam on the optical axis $200_{1L}$ of the LED element $200_1$ passes through a position $300_{1O}$ which has shifted from the center $300_{1C}$ of the cell lens $300_1$ of the collimator lens 300. As a result, the light beam is converted into a parallel light beam, then being illuminated onto a point $4_{1O}$ which has shifted from the center $4_{1C}$ of the cell lens $4_1$.

Here, although the cell lens of the first lens array 4 and that of the second lens array 5 are located such that their planar surfaces are opposed to each other, the cell lenses can also be located such that their convex surfaces are opposed to each other. Also, the cell lenses can be located such that their convex surfaces are oriented in the same direction.

The above-described explanation has been given concerning only the one set within the $m_1$ row×$n_1$ column. The explanation, however, is basically the same in another set of a LED element of the LED light source 200, a cell lens of the collimator lens 300, a cell lens of the first lens array 4, and a cell lens of the second lens array 5. Namely, a cell lens $300_i$ of the collimator lens 300, a cell lens $4_i$ of the first lens array 4, and a cell lens $5_i$ of the second lens array 5 which belong to a mutually-corresponding arbitrary one set (hereinafter, subscript i will be used for indicating an arbitrary one set) coincide with each other in their optical axes. Also, the light-emitting center $200_{iC}$ of the LED element $200_i$ is located such that the light-emitting center $200_{iC}$ is positioned on the extension of this optical axis. Moreover, optical axis $200_{iL}$ of the LED element $200_i$ is inclined at the predetermined angle with respect to the optical axis $300_{iL}$ of the cell lenses.

Subsequently, getting back to FIG. 1, the explanation will be given below concerning the lights outgoing from the second lens array 5. The lights outgoing from the second lens array 5 are aligned into a predetermined polarization direction by the polarization conversion element 6. Moreover, light-source images from the LED elements projected on the respective cell lenses of the first lens array 4 are formed as an image on the liquid-crystal panel 10 by being superimposed with each other by the light-converging lens 7 and the condenser lens 8. Here, it is desirable that configuration of the liquid-crystal panel 10 and the light-source images on the respective cell lenses of the first lens array 4 formed as the image on the liquid-crystal panel 10 by being superimposed be substantially similar and substantially identical to each other. Consequently, it is also desirable that configuration of each cell lens of the first lens array 4 and configuration of each cell lens of the second lens array 5 be substantially similar to the configuration of the liquid-crystal panel 10.

The lights incoming into the liquid-crystal panel 10 are aligned into the predetermined polarization direction by the polarization conversion element 6. The lights incoming into the polarization conversion element 6, however, have predetermined incident angles. This condition makes it difficult to align the lights into the predetermined polarization direction completely. Consequently, of the lights which have passed through the polarization conversion element 6, there exist lights which have somewhat different polarization directions. Without some countermeasure to be taken, this situation would result in a degradation in the contrast performance. Accordingly, the incoming-side sheet polarizer 9 is located immediately before the liquid-crystal panel 10, thereby eliminating the lights with the different polarization directions.

On the liquid-crystal panel 10, the not-illustrated image-signal driving circuit performs the following light intensity modulation, thereby forming the optical image: Namely, in the light intensity modulation, light amount with which the lights illuminated onto the liquid-crystal panel 10 will pass through the liquid-crystal panel 10 is controlled in response to an image signal, thereby varying the light-and-shade on each pixel basis. Furthermore, from the optical image on the liquid-crystal panel 10, the outgoing-side sheet polarizer 11 eliminates lights with unnecessary polarization directions. Then, the resultant optical image is projected on the screen 13 by the projection lens 12, thereby making it possible to acquire a large-screen image.

Figure 3:
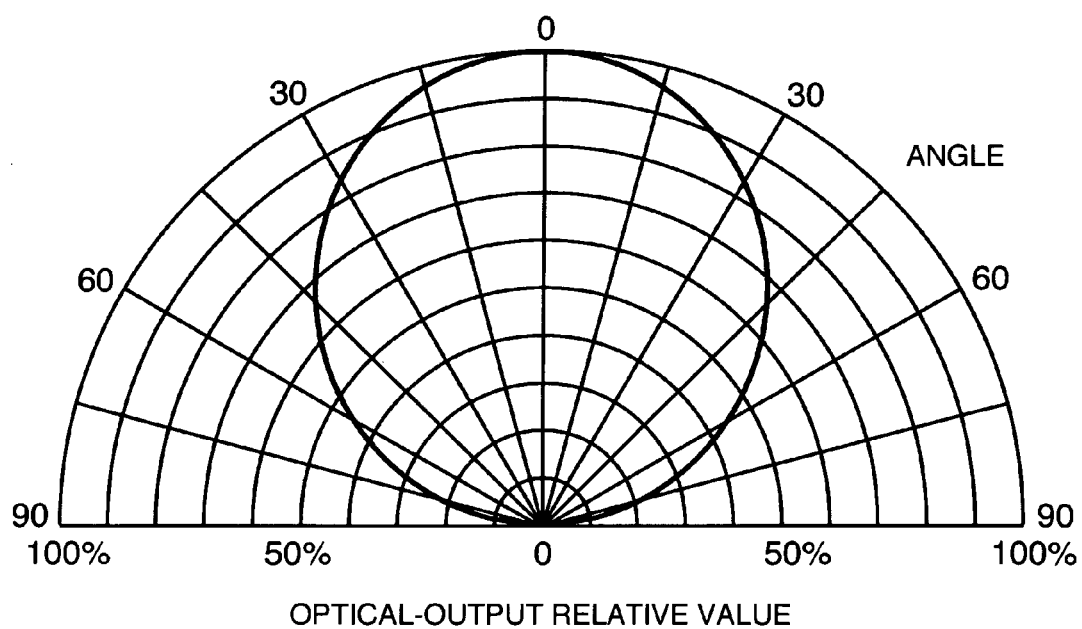
FIG. 3 is a diagram for illustrating optical output characteristics of the LED element.
Figure 4:
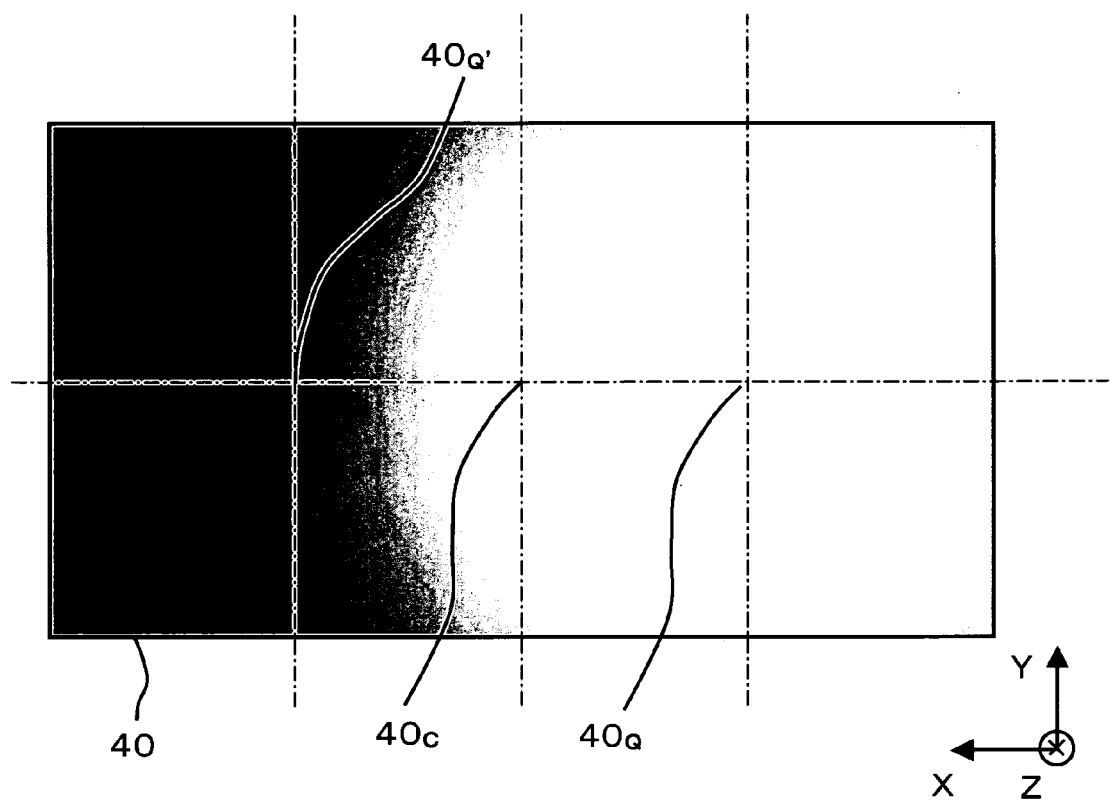
FIG. 4 is a diagram for illustrating a projection image by a single LED element.

FIG. 3 is a diagram for illustrating optical output characteristics of the LED element. FIG. 4 is a diagram for illustrating a projection image formed in the case where only the single LED element extracted in FIG. 2 is projected on the screen.

As illustrated in FIG. 3, the light outgoing from the LED element 200, exhibits its maximum optical output in its optical-axis direction (i.e., angle 0°). Moreover, the optical output becomes gradually smaller as the light steps away from its optical-axis direction. Consequently, the light from the LED element $200_1$ projected onto the cell lens $4_1$ of the first lens array 4 exhibits its maximum brightness at the point $4_{1O}$ through which the light on the optical axis $200_{1L}$ of the LED element $200_1$ passes. Moreover, the brightness becomes gradually darker as the light steps away from the point $4_{1Q}$. This light illuminated on the cell lens $4_1$ of the first lens array 4 is projected onto the liquid-crystal panel 10 by the cell lens $5_1$ of the second lens array 5, the light-converging lens 7, and the condenser lens 8. Then, the image on the liquid-crystal panel 10 is enlarged and projected on the screen 13. As a result, as illustrated in FIG. 4, a projection image 40 projected on the screen 13 exhibits its maximum brightness at a point $50_Q$ corresponding to the point $4_{1Q}$ on the cell lens $4_1$ of the first lens array 4. Furthermore, the brightness becomes gradually darker as the projection image steps away from this point $40_Q$.

Incidentally, in FIG. 4, numeral $40_C$ indicates a point which corresponds to the center $4_{1C}$ of the cell lens $4_1$ of the first lens array 4, and which is substantial center of the projection image 40. Also, numeral $40_Q$, indicates a point on the screen corresponding to the following point: Namely, at this point, light on the optical axis outgoing from light-emitting center of a LED element whose inclination in its optical-axis direction is inverse to the inclination of the LED element $200_1$ passes through on the corresponding cell lens of the first lens array 4.

As is apparent from FIG. 1, the two types of inclinations at which the optical-axis directions of the LED elements differ from each other are substantially symmetric to each other with reference to the cell-lens optical axis. As a result, the point $40_Q$ and the point $40_{Q'}$ on the screen become substantially right-and-left symmetric to each other with reference to the point $40_C$ (i.e., with reference to direction axis parallel to shorter side passing through the point $40_C$). Consequently, when the lights are projected onto the screen from the two types of LED elements whose optical-axis directions differ from each other, the brightness turns out to be averaged. Of course, averaging the brightness is impossible unless the distance between the point $40_Q$ and the point $40_{Q'}$ is set properly. Accordingly, it is needless to say that the inclinations of the optical axes of the LED elements are selected so that the brightness will be averaged.

Hereinafter, for the sake of convenience, the following phenomenon will be represented as "shift of the optical axis of the LED element": Namely, as illustrated in, e.g., FIG. 4, the light on the optical axis outgoing from the light-emitting center of the LED element is formed as the image at the point $40_Q$ which has shifted (i.e., has deviated) from the center $40_C$ of the projection image 40 on the screen 13 (or, the point $4_{1Q}$ which has shifted from the center $4_{1C}$ of the cell lens $4_1$). Also, the shift direction (i.e., deviation direction) thereof will be represented as "shift direction of the optical axis".

Figure 5:
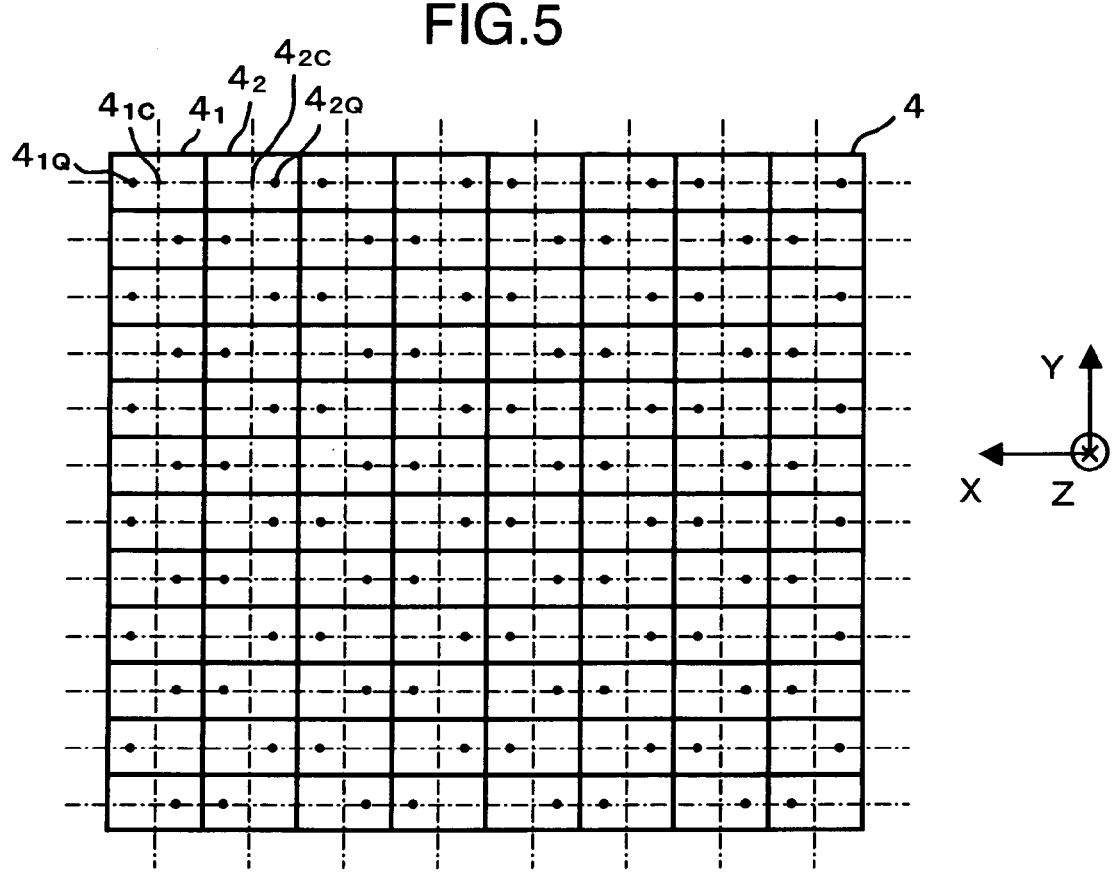
FIG. 5 is a diagram for illustrating shifts of optical axes of the LED elements.

FIG. 5 is a diagram for illustrating positions $4_{iQ}$ at which the lights on the optical axes outgoing from the light-emitting centers of the respective LED elements which configure the LED light source 200 illuminate the respective cell lens $4_i$ of the first lens array 4. Namely, FIG. 5 is the diagram for illustrating the shifts of the optical axes of the LED elements on the incoming surface of the first lens array 4. In FIG. 5, in the first lens array 4, numeral of the cell lens at top-left on the first line (longer-side direction) is defined as $4_1$. Then, $4_{1C}$ is the center of the cell lens $4_1$, and $4_{1Q}$ of the black-circle point is the point onto which the light on the optical axis outgoing from the light-emitting center of the not-illustrated LED element $200_1$ (hereinafter, abbreviated as "the light on the optical axis") is illuminated (refer to FIG. 2). In this case, the LED element $200_1$ corresponds to the LED element $200a$ oriented in the left direction (positive direction) of the longer-side direction (X-axis direction) in FIG. 1. In the adjacent cell lens $4_2$ as well, similarly, $4_{2C}$ is the center of the cell lens $4_2$, and $4_{2Q}$ is the point onto which the light on the optical axis of the not-illustrated LED element $200_2$ is illuminated. The LED element $200_2$ corresponds to the LED element $200b$ oriented in the right direction (negative direction) of the longer-side direction (X-axis direction) in FIG. 1. In the cell lenses $4_i$ other than $4_1$ and $4_2$ as well, similarly, the black-circle points "•" are the points onto which the lights on the optical axes of the LED elements $200_i$ are illuminated.

As is apparent from FIG. 5, in the cell lens $4_1$, the optical axis of the LED element $200_1$ corresponding to the cell lens $4_1$ has shifted (i.e., has deviated) in the left direction within the drawing. Also, in the cell lens $4_2$, the optical axis of the LED element $200_2$ corresponding to the cell lens $4_2$ has shifted (i.e., has deviated) in the right direction within the drawing. Similarly, hereinafter, the shift directions of the optical axes of the LED elements $200_i$ have become inverse to each other alternately.

On the next line, the shift directions of the optical axes of the LED elements $200_i$ have become inverse to the ones on the first line. Similarly, hereinafter, in the column direction, the shift directions of the optical axes of the LED elements $200_i$ have become inverse to each other alternately.

As illustrated in FIG. 5, arranging the LED elements of the LED light source 200 in the above-described manner allows the shift directions of the optical axes of the LED elements to be made substantially right-and-left uniform. This is because the LED elements $200a$ and the LED elements $200b$ are substantially equal in number. In accompaniment with this, the light-source images from the LED elements which have been formed on the respective cell lenses of the first lens array 4 and whose optical axes have been shifted in the right and left directions are formed as the image on the liquid-crystal panel 10 by being superimposed with each other. As a result, the brightness (i.e., luminance) as a whole on the liquid-crystal panel 10 becomes a substantially uniform brightness, since nonuniformities of the luminance are compensated with each other. Namely, on the screen, it becomes possible to acquire the projection image where the entire picture exhibits the substantially uniform brightness and the luminance unevenness has been reduced.

Figure 6:
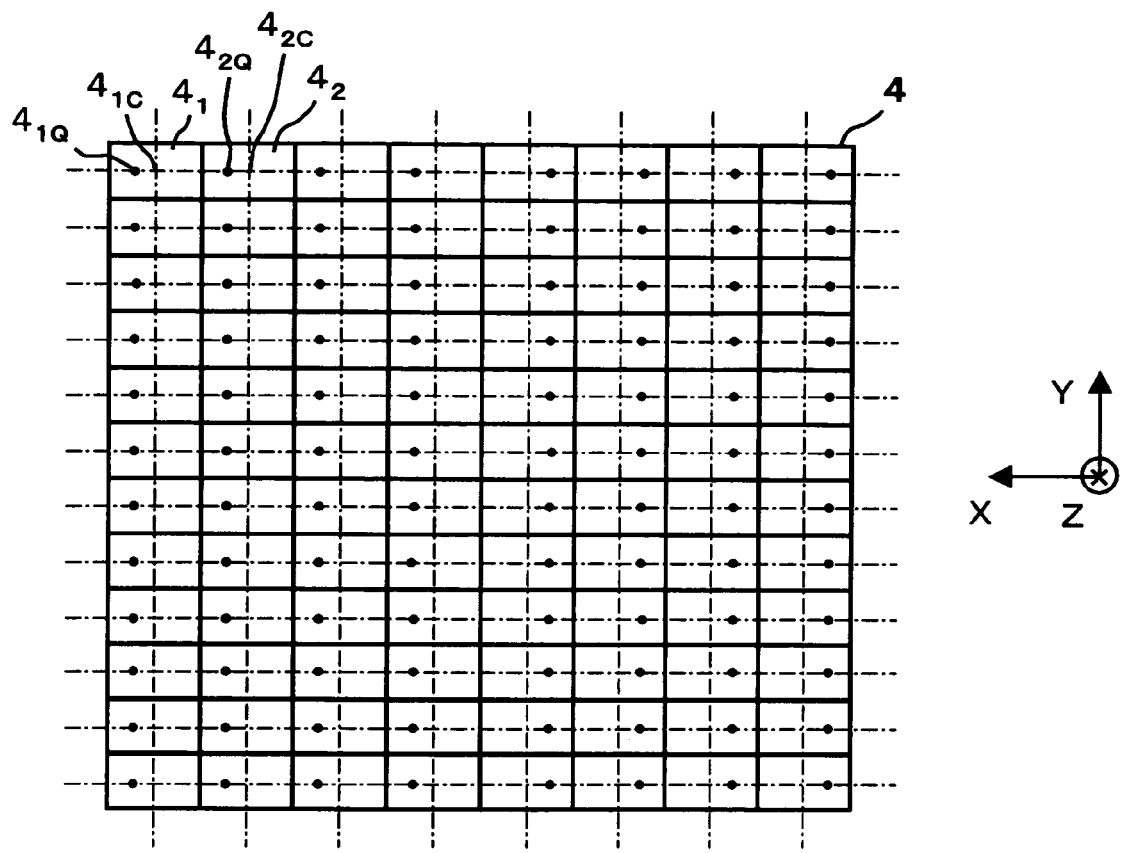
FIG. 6 is a diagram for illustrating shifts of optical axes of the LED elements based on another location example of the LED elements.

Although, in the embodiment in FIG. 5, the shift directions of the optical axes of the LED elements are made inverse to each other alternately in the row direction, the present invention is not limited thereto. For example, as illustrated in FIG. 6, the shift directions may be changed between the left side and the right side of the first lens array 4. This is because the entire brightness can be made uniform as long as total light amounts in the respective shift directions are substantially equal to each other.

As explained in the prior art described earlier, the optical axes of the LED elements of the LED light source are shifted in parallel to the optical axes of the cell lenses of the first lens array 4. Similarly to the image display device of the present invention, this shifting also makes it possible to acquire the projection image that exhibits its maximum brightness at the position which has shifted from the center on the screen. Accordingly, by uniformly distributing the directions in which the optical axes of the LED elements are shifted, it becomes possible to acquire the projection image where the entire picture has the substantially uniform brightness.

In the prior art, however, since the lights of the LED elements are directly illuminated onto the first lens array 4, the lights incoming into the first lens array 4 are not parallel lights. Consequently, the lights on the optical axes of the LED elements which are parallel to the optical axes of the cell lenses of the first lens array 4 and which exhibit the maximum light intensity are not positioned on the optical axes of the cell lenses of the first lens array 4. This is because the optical axes of the LED elements are shifted in parallel to the optical axes of the cell lenses of the first lens array 4. This position relationship prevents the lights projected onto the cell lenses of the first lens array 4 from being formed as the images at the centers of the cell lenses of the second lens array 5. Accordingly, the brightness is decreased when the lights pass through the first lens array 4 and the second lens array 5.

In contrast thereto, in the image display device of the present invention, the light-emitting centers of the LED elements are positioned on the optical axes of the cell lenses of the collimator lens 300. This position relationship permits the lights illuminated onto the cell lenses of the first lens array 4 to be formed as the images at the centers of the cell lenses of the second lens array 5. Accordingly, the brightness is not decreased when the lights pass through the first lens array 4 and the second lens array 5. This condition allows the lights incoming into the cell lenses of the first lens array 4 to be guided to the liquid-crystal panel and to be projected on the screen with a high efficiency. Consequently, it becomes possible to reduce the luminance unevenness.

Also, if the brightnesses on the right and left sides differ from each other on the liquid-crystal panel (i.e., on the screen) because of, e.g., tolerances of the components or the like, according to the present embodiment, the driving circuits 400a and 400b are controlled via the control circuit 400d by the adjustment key 500 which is operable from the outside. This control makes it possible to vary the brightness of group of the LED elements whose optical axes are shifted in the right direction and the one of group of the LED elements whose optical axes are shifted in the left direction, thereby allowing implementation of uniformity of the brightness. In this way, the lights of the LED elements' groups whose shift directions of the optical axes differ from each other are adjusted independently. This makes it possible to reduce the luminance unevenness.

From the configuration explained so far, the image display device of the present first embodiment allows the lights from the light source to be projected onto the screen with a high efficiency. Furthermore, the image display device allows acquisition of the high-grade projection image having no luminance unevenness.

As having been explained so far, the essence of the present invention is as follows: Namely, the lights on the optical axes outgoing from the light-emitting centers of the respective LED elements which configure the LED light source are illuminated onto the liquid-crystal panel in such a manner that the lights are shifted from the center of the liquid-crystal panel and are superimposed with each other thereon. This configuration makes it possible to compensate with each other the nonuniformities of the luminance (i.e., brightness) on the liquid-crystal panel, thereby allowing the entire picture to exhibit the substantially uniform brightness.

Consequently, on the liquid-crystal panel, there are provided a plurality of groups (in the present embodiment, the two groups of the LED elements 200a and 200b) including the points onto which the lights on the optical axes of the respective LED elements are illuminated. Moreover, the illuminated points are made substantially symmetric (in the present embodiment, substantially right-and-left symmetric) to each other with reference to the center of the liquid-crystal panel. Simultaneously, the total light amounts of the respective groups are made substantially equal (in the present embodiment, the respective LED elements belonging to the respective groups are substantially equal in number). This configuration reduces the nonuniformities of the luminance (i.e., brightness) on the liquid-crystal panel.

Of course, it is needless to say that the distances between the center of the liquid-crystal panel and the images-formed points for the lights on the optical axes of the respective LED elements are set properly so that the luminance unevennesses occurring in the respective groups can be canceled out with each other. For this purpose, in FIG. 1, the two types of inclinations of the optical axes of the LED elements with reference to the cell-lens optical axis of the collimator lens 300 are set as the predetermined angles. Simultaneously, the angles are made substantially symmetric with reference to the cell-lens optical axis.

In the present embodiment, the groups of the LED elements whose shift directions of the optical axes differ from each other have been set as two in number. Moreover, the shift directions of the optical axes of the LED elements have been set as the right and left directions. The present invention, however, is not limited thereto. Namely, the shift directions of the optical axes of the LED elements and the number of the shift directions may be changed appropriately, depending on factors such as size of the cell lenses of the first lens array, the optical-output relative value of the LED elements, and aspect ratio of the liquid-crystal panel.

For example, in the case of a wide screen such as a case where the aspect ratio of the liquid-crystal panel is equal to 16:9, in addition to the two directions of right and left, with respect to a part of the LED elements, optical axes of the part of the LED elements and the cell-lens optical axes of the collimator lens 300 and the first lens array 4 are caused to coincide with each other (i.e., there exist no shifts of the optical axes). This partial coincidence causes the optical axes of the part of the LED elements to be images-formed at the centers $4_{iC}$ (i is subscript for indicating an arbitrary cell) of the respective cell lenses $4_i$ of the first lens array 4 in FIG. 5, namely, to be projected at the central point $40_C$ of the projection image 40 in FIG. 4. As a result of this image-formation or projection, it becomes possible to improve the luminance unevenness even in the case of the transversely-long wide screen. Implementing the configuration like this makes it possible to reduce the luminance unevenness properly in a case where a lack of the brightness at the screen center occurs since the distance between the point $40_Q$ of the projection image and the central point $40_C$ of the projection image gets too long and apart. In this case, it is desirable that the numbers of the LED elements belonging to the respective groups be made equal to substantially one-third of the total number.

Figure 7:
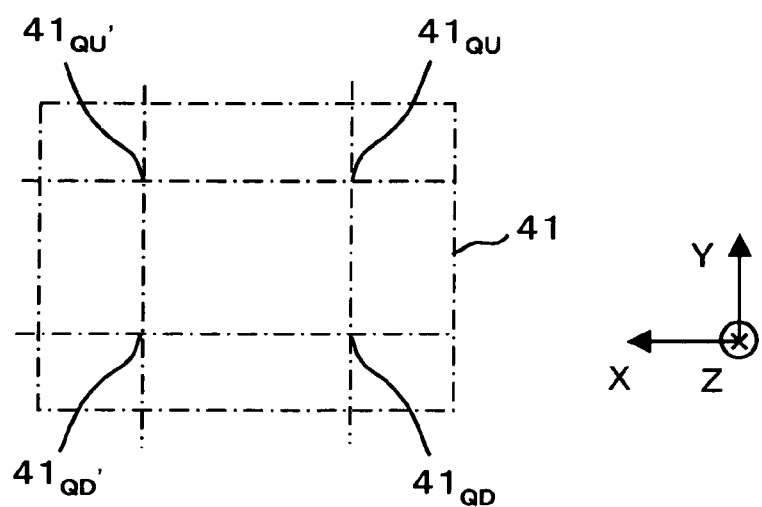
FIG. 7 is a diagram for illustrating a projection image by a LED element having a different optical-axis inclination.

Also, if the cell lenses of the first lens array 4 are larger in size as compared with the LED elements, the following configuration is preferable: Namely, in the respective groups of the LED elements 200a and 200b in FIG. 1, substantially one-half of the optical axes thereof are inclined at a predetermined angle in positive direction (hereinafter, this direction will be referred to as "top") of the Y-axis direction (shorter-side direction) with reference to the cell-lens optical axes. Also, substantially one-half of the optical axes thereof are inclined at a predetermined angle in negative direction (hereinafter, this direction will be referred to as "bottom") of the Y-axis direction (shorter-side direction) with reference to the cell-lens optical axes. As illustrated in FIG. 7, this inclination causes projection points $41_{QU}$, $41_{QD}$, $41_{QU'}$, and $41_{QD'}$ for lights on the optical axes of four groups of the LED elements to be formed on a projection image 41 projected onto the screen 13. This configuration also makes it possible to make brightness of the projection image 41 uniform and to reduce the luminance unevenness. Namely, in addition to the right-to-left directions, top-to-bottom directions are added to the shift directions of the LED elements, thereby implementing the configuration of the four directions, i.e., the top-right, bottom-right, top-left, and bottom-left directions. In this case, it is desirable that the numbers of the LED elements belonging to the respective groups be made equal to substantially one-fourth of the total number.

Also, in the case of the LED elements whose characteristic is that the optical outputs decrease tremendously as the lights step away from the optical axes (i.e., angle 0°), the following configuration is preferable: Namely, for example, nine directions, i.e., top-right, right, bottom-right, top, center, bottom, top-left, left, and bottom-left directions, are implemented as the shift directions of the optical axes of the LED elements, thereby making the shift directions of the optical axes of the LED elements and the number thereof as many as possible. This makes it possible to reduce the luminance unevenness even further.

Also, in the present embodiment, as illustrated in FIG. 4, the LED elements have been arranged such that the LED elements will become substantially symmetric with reference to the direction axis parallel to the shorter side passing through the point $40_C$. The present invention, however, is not necessarily limited thereto. For example, the LED elements may be arranged such that the LED elements will become substantially symmetric with reference to the direction axis parallel to longer side passing through the point $40_C$ in FIG. 4. Also, the LED elements may be arranged such that the LED elements will become substantially point-symmetric with reference to the point $40_C$ in FIG. 4. It is needless to say that, as described above, arranging the LED elements so that the brightness of the projection image 41 will become uniform makes it possible to reduce the luminance unevenness. If, however, the light-emitting centers of the LED elements are positioned at seam portions of the lens cells of the lens array, utilization efficiency of the lights will be reduced. This is because configuration accuracy of outer circumference of one lens cell is not good enough. Consequently, it is desirable to locate the LED elements such that the light-emitting centers of the LED elements will be not positioned at the seam portions of the lens cells of the lens array. Also, when designing the image display device according to the present invention, the LED elements are located such that the LED elements are inclined. This makes it possible to facilitate the design.

In the present embodiment, the optical axes of the cell lenses of the first lens array 4 and the ones of the cell lenses of the second lens array 5 have been caused to coincide with the optical axes of the cell lenses of the collimator lens 300. The present invention, however, is not limited thereto. In the integrator optical system of lens-array scheme, as is disclosed in JP-3473075 for example, the optical system can be designed such that, even if the cell lenses of the first lens array 4 are decentered, light-source images formed on the cell lenses will be superimposed with each other and images-formed on the liquid-crystal panel. Accordingly, the central points of the rectangle-shaped cell lenses are images-formed at the center of the liquid-crystal panel. Consequently, by preventing the lights on the optical axes outgoing from the light-emitting centers of the LED elements from being illuminated at the central points of the rectangle-shaped cell lenses of the first lens array 4, it becomes possible to accomplish the object of the present invention. As a result, as long as the light-emitting centers of the LED elements are positioned on the optical axes of the cell lenses of the collimator lens 300, the optical axes of the cell lenses of the first lens array 4 and the ones of the cell lenses of the second lens array 5 are not required to coincide with the optical axes of the cell lenses of the collimator lens 300. Namely, the cell lenses of the first lens array 4 and the cell lenses of the second lens array 5 may be decentered.

[Second Embodiment]

In the first embodiment, with reference to the respective cell-lens optical axes of the collimator lens 300, the optical axes of the respective LED elements corresponding thereto are inclined. As a result, the lights on the optical axes outgoing from the light-emitting centers of the respective LED elements are caused to income into the rectangle-shaped configurations of the cell lenses of the first lens array 4 in such a manner that the lights have shifted (i.e., have deviated) from the centers of the rectangle-shaped configurations. This allows the lights on the optical axes of the respective LED elements to be illuminated onto the liquid-crystal panel and superimposed with each other thereon in such a manner that the lights are shifted from the central point of the liquid-crystal panel. This is because the light-source images from the respective LED elements formed on the cell lenses of the first lens array 4 are projected onto the liquid-crystal panel.

However, the essence of the present invention is as follows: Namely, the lights on the optical axes of the respective LED elements which configure the LED light source are illuminated onto the liquid-crystal panel and superimposed with each other thereon in such a manner that the lights are shifted from the central point of the liquid-crystal panel. That is to say, the lights are caused to income into the rectangle-shaped configurations of the cell lenses of the first lens array 4 in such a manner that the lights are shifted from the centers of the rectangle-shaped configurations.

In view of this essence, the following method is also effective: Namely, the respective cell lenses of the collimator lens are decentered, and the optical axes of the respective LED elements corresponding thereto are caused to coincide with the optical axes of the respective cell lenses of the collimator lens. This configuration also causes the lights on the optical axes of the respective LED elements to income into the rectangle-shaped configurations of the cell lenses of the first lens array 4 in such a manner that the lights are shifted from the centers of the rectangle-shaped configurations. Hereinafter, referring to FIG. 8 and FIG. 9, the explanation will be given below concerning a second embodiment based on this method.

Figure 8:
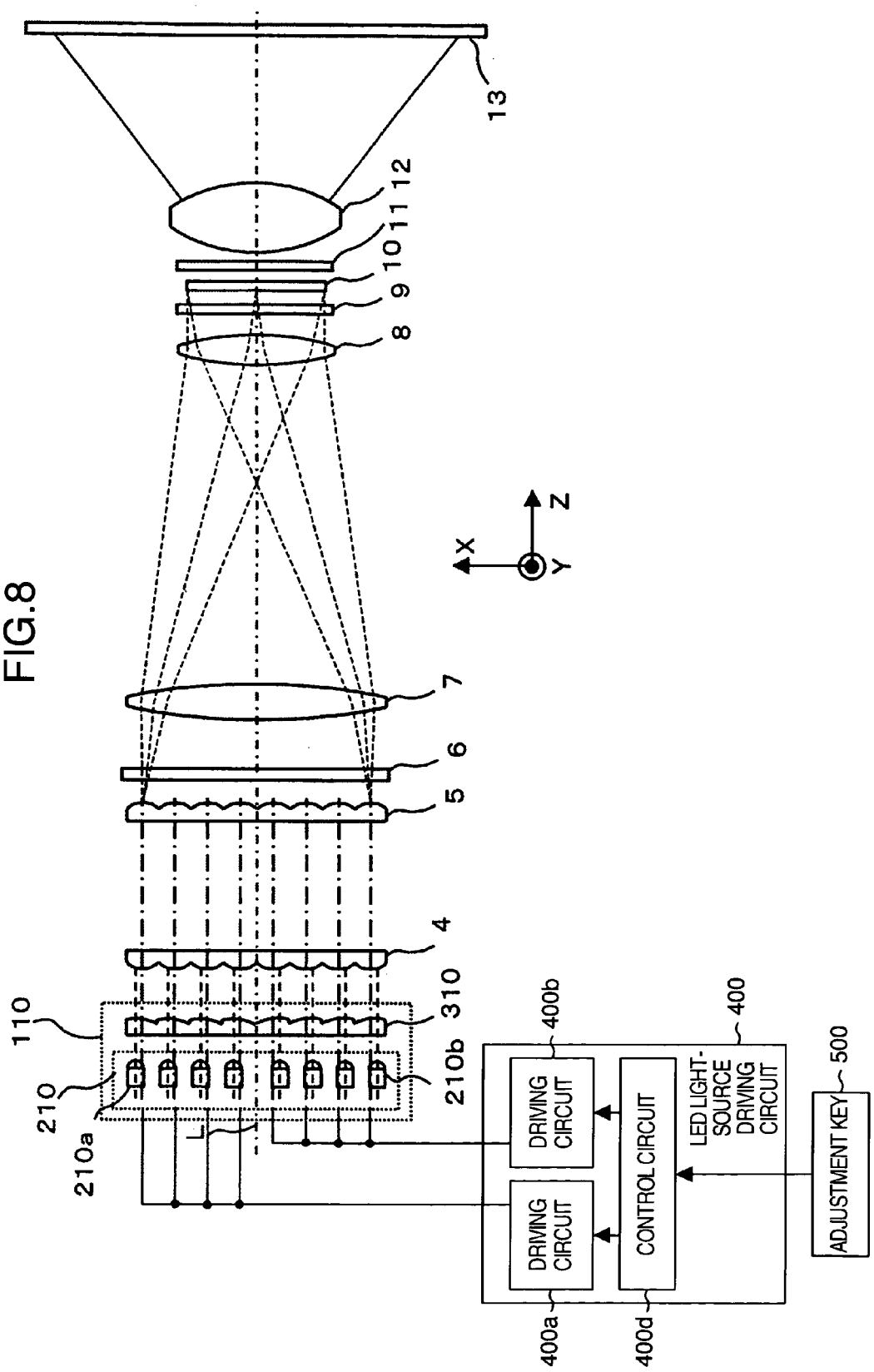
FIG. 8 is a schematic configuration diagram of an image display device of a second embodiment according to the present invention.
Figure 9:
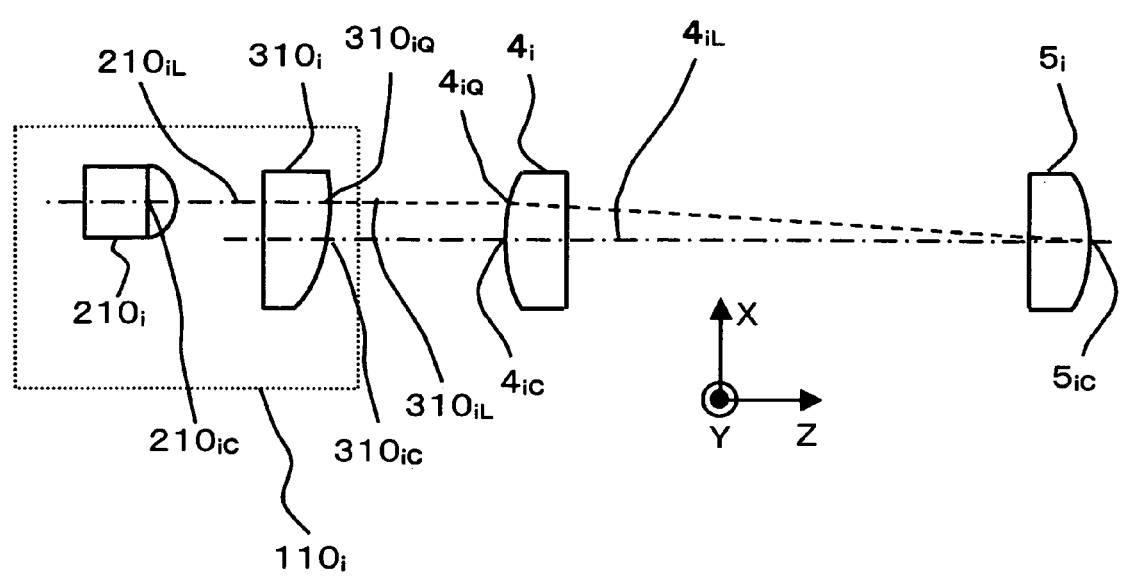
FIG. 9 is a partially enlarged view of a portion acquired by extracting one set of components ranging from a LED element to the cell lens of a second lens array of the second embodiment according to the present invention.

FIG. 8 is a schematic configuration diagram acquired by seeing from above an image display device which indicates the second embodiment according to the present invention. FIG. 9 is a partially-enlarged detailed view where a mutually-corresponding arbitrary one set of each LED element of a LED light source, each cell lens of a collimator lens, each cell lens of a first lens array, and each cell lens of a second lens array in FIG. 8 are extracted and illustrated. In FIG. 8, a numeral 110 denotes a light-source unit. The light-source unit 110 is configured by the LED light source 210 and the collimator lens 310. The LED light source 210 includes a plurality of LED elements emitting monochromatic light and arranged in a two-dimensional manner (an array-like manner). The collimator lens 310 includes a plurality of decentered cell lenses which are in a one-to-one correspondence with the respective LED elements of the LED light source 210, and which are arranged in a two-dimensional manner (an array-like manner). Also, in FIG. 9, the mutually-corresponding arbitrary one set of each LED element of the LED light source, each cell lens of the collimator lens, each cell lens of the first lens array, and each cell lens of the second lens array are indicated by affixing one and the same subscript i (i is subscript for indicating an arbitrary one set of elements). The other configuration components in FIG. 1 and FIG. 2 denoted by the same reference numerals have the same functions. The explanation thereof will be omitted for avoiding complexity.

Optical axes $210_{iL}$ of the respective LED elements $210_i$ of the LED light source 210 coincide with optical axes $310_{iL}$ of the respective corresponding cell lenses $310_i$ of the collimator lens 310. Meanwhile, the optical axes $210_{iL}$ do not coincide with optical axes $4_{iL}$ of the respective corresponding cell lenses $4_i$ and $5_i$ of the first lens array 4 and the second lens array 5, and are shifted in a predetermined direction. Of these LED elements $210_i$, reference numeral of the LED elements shifted in positive direction (left direction) of the X-axis direction (longer-side direction) with reference to the optical axes $4_{iL}$ are defined as $210a$, and reference numeral of the LED elements shifted in negative direction (right direction) of the X-axis direction (longer-side direction) with reference thereto are defined as $210b$. The LED elements $210a$ and the LED elements $210b$ are substantially equal in number. The respective LED elements $210a$ are connected to each other, and are driven by a driving circuit $400a$ of a LED light-source driving circuit 400. Similarly, the respective LED elements $210b$ are connected to each other, and are driven independently of the LED elements $210a$ by a driving circuit $400b$ of the LED light-source driving circuit 400.

The respective cell lenses $310_i$ of the collimator lens 310 are decentered. Accordingly, the optical axes $310_{iL}$ of the respective cell lenses $310_i$ do not coincide with the optical axes $4_{iL}$ of the respective corresponding cell lenses $4_i$ and $5_i$ of the first lens array 4 and the second lens array 5. Also, decentered directions of the respective cell lenses $310_i$ of the collimator lens 310 are configured as follows: Namely, the decentered directions correspond to the LED elements and thus are of the longer-side direction (X-axis direction), and the decentered directions differ (decentered amounts are substantially equal) with, e.g., the optical axis L of the illumination optical system as the boundary.

Incidentally, light-emitting centers $210_{iC}$ of the respective LED elements $210_i$ of the LED light source 210 are positioned at substantially focal points of the respective cell lenses $310_i$ of the collimator lens 310.

As illustrated in FIG. 9, lights outgoing from the light-emitting centers $210_{iC}$ of the LED elements $210_i$ of the LED light source 210 are converted into parallel lights by the cell lenses $310_i$ of the collimator lens 310, then incoming into the corresponding cell lenses $4_i$ of the first lens array 4. At this time, the optical axes $210_{iL}$ and $310_{iL}$ of the LED elements $210_i$ and the cell lenses $310_i$ are shifted (i.e., are decentered) with reference to the optical axes $4_{iL}$ of the respective cell lenses $4_i$ and $5_i$ of the first lens array 4 and the second lens array 5, i.e., the integrator optical system. As a result, the lights on the optical axes outgoing from the light-emitting centers $210_{iC}$ of the LED elements $210_i$ income into points $4_{iO}$ which have shifted from centers $4_{iC}$ of the cell lenses $4_i$ of the first lens array 4. Then, light-source images formed on the cell lenses $4_i$ are superimposed with each other and images-formed on the liquid-crystal panel 10. Here, the centers $4_{iC}$ of the cell lenses $4_i$ are projected onto center of the liquid-crystal panel 10. Consequently, it turns out that the lights on the optical axes of the LED elements $210_i$ will be projected onto positions which have shifted from the center of the liquid-crystal panel 10.

The respective LED elements are configured by the two types of groups of LED elements $210a$ and $210b$ whose shift directions of the optical axes differ from each other with reference to the optical axes of the integrator optical system. Simultaneously, the LED elements belonging to the respective groups are substantially equal in number. As a result, the light-source images formed on the liquid-crystal panel 10 from the respective groups of LED elements $210a$ and $210b$ are compensated with each other in the luminance unevennesses (i.e., brightness) thereof. Accordingly, the brightness as a whole becomes a substantially uniform brightness. Consequently, on the screen, it becomes possible to acquire a projection image where the entire picture exhibits the substantially uniform brightness and the luminance unevenness has been reduced.

Also, in the present embodiment, the groups of the LED elements whose shift directions of the optical axes differ from each other have been set as two in number. Moreover, the shift directions of the optical axes of the LED elements have been set as the right and left directions. The present invention, however, is not limited thereto. Namely, as is the case with the first embodiment, the shift directions of the optical axes of the LED elements and the number of the shift directions may be changed appropriately, depending on factors such as size of the cell lenses of the first lens array, the optical-output relative value of the LED elements, and aspect ratio of the liquid-crystal panel.

[Third Embodiment]

Figure 10:
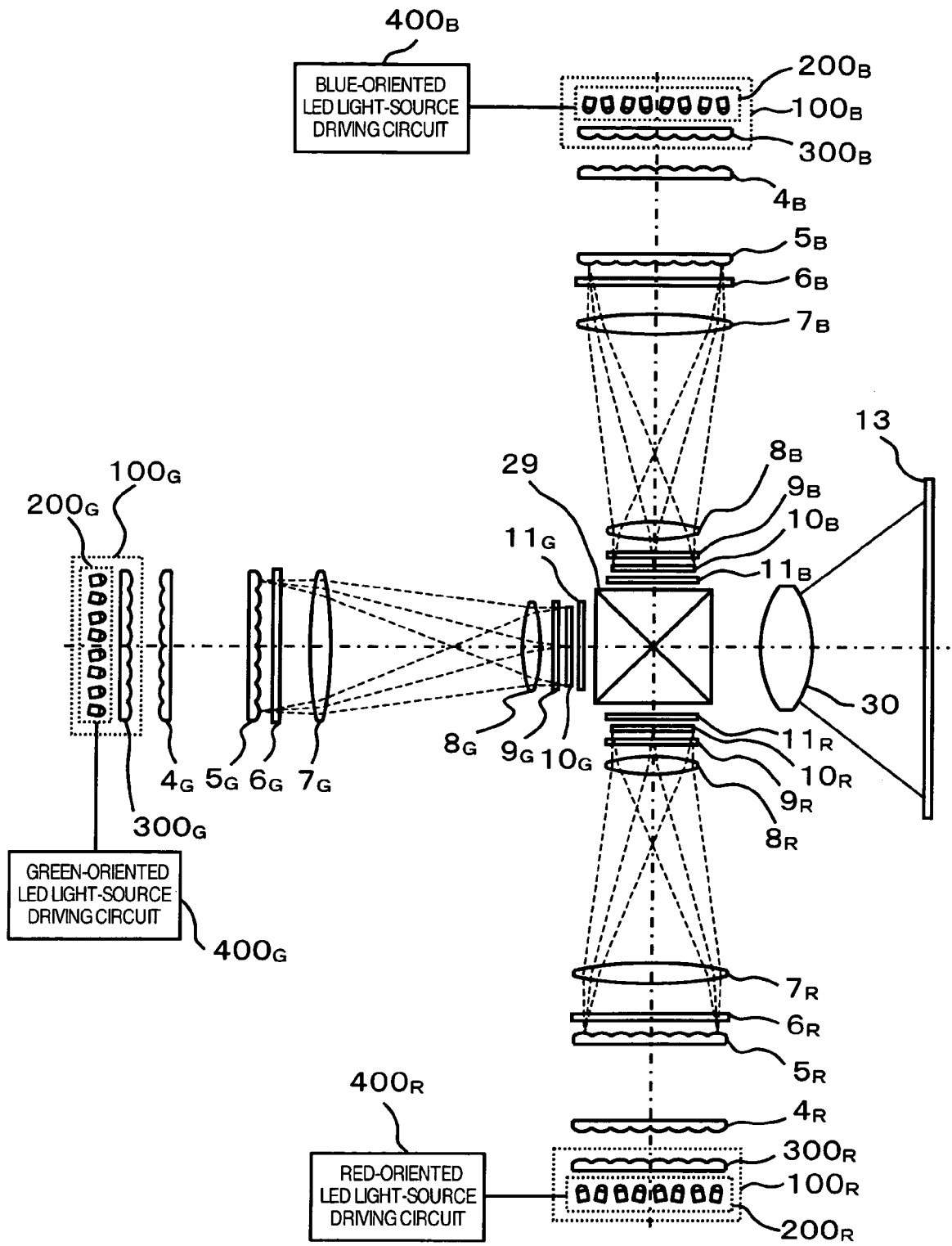
FIG. 10 is a schematic configuration diagram of an image display device of a third embodiment according to the present invention.

FIG. 10 is a schematic configuration diagram of an image display device which is a third embodiment according to the present invention. In FIG. 10, for each of LED panels designed for red, green, and blue lights, there is provided an illumination optical system whose configuration is the same as that of the illumination optical system in FIG. 1 for illuminating the light from the LED light-source unit onto the liquid-crystal panel.

In FIG. 10, numeral $100_R$ denotes a red-oriented light-source unit, numeral $100_G$ denotes a green-oriented light-source unit, and numeral $100_B$ denotes a blue-oriented light-source unit.

The red-oriented light-source unit $100_R$ is configured by a red-oriented LED light source $200_R$ including a plurality of LED elements arranged in an array-like manner ($m_2$ row×$n_2$ column) and emitting red light, and a collimator lens $300_R$ including a plurality of cell lenses which are similarly arranged in an array-like manner ($m_2$ row×$n_2$ column). Similarly, the green-oriented light-source unit $100_G$ is configured by a green-oriented LED light source $200_G$ including a plurality of LED elements arranged in an array-like manner ($m_2$ row×$n_2$ column) and emitting green light, and a collimator lens $300_G$ including a plurality of cell lenses which are similarly arranged in an array-like manner ($m_2$ row×$n_2$ column). Similarly, the blue-oriented light-source unit $100_B$ is configured by a blue-oriented LED light source $200_B$ including a plurality of LED elements arranged in an array-like manner ($m_2$ row×$n_2$ column) and emitting blue light, and a collimator lens $300_B$ including a plurality of cell lenses which are similarly arranged in an array-like manner ($m_2$ row×$n_2$ column).

Numerals $400_R$, $400_G$, and $400_B$ denote a red-oriented LED light-source driving circuit for driving the red-oriented LED light source $200_R$, a green-oriented LED light-source driving circuit for driving the green-oriented LED light source $200_G$, and a blue-oriented LED light-source driving circuit for driving the blue-oriented LED light source $200_B$, respectively. Their function is the same as the one of the LED light-source driving circuit 400 in the first embodiment except for a point that the emitted-lights' colors from the LED elements controlled thereby differ from each other. As is the case with FIG. 1, optical axes of the each-color-oriented LED elements are inclined with reference to optical axes of cell lenses of the collimator lens corresponding thereto. Furthermore, light-emitting centers of the LED elements are positioned on the optical axes of the cell lenses, and also are positioned at substantially focal points of the cell lenses. Consequently, lights outgoing from the respective LED elements of the respective LED light sources $200_R$, $200_G$, and $200_B$ are converted into substantially parallel lights by the respective cell lenses of the collimator lenses $300_R$, $300_G$, and $300_B$.

Also, as is the case with FIG. 1, optical axes of respective cell lenses of one set of a collimator lens, a first lens array, and a second lens array corresponding to a certain each-color-oriented LED element coincide with each other.

The lights outgoing from the red-oriented light-source unit $100_R$, the green-oriented light-source unit $100_G$, and the blue-oriented light-source unit $100_B$ are uniformly illuminated onto a red-oriented liquid-crystal panel $10_R$, a green-oriented liquid-crystal panel $10_G$, and a blue-oriented liquid-crystal panel $10_B$, respectively. Since the process up to this stage is basically the same as the one in the first embodiment, the explanation thereof will be omitted.

On the each-color-oriented liquid-crystal panels $10_R$, $10_G$, and $10_B$, a not-illustrated image-signal driving circuit performs the following light intensity modulation, thereby forming optical images corresponding to the respective colors: Namely, in the light intensity modulation, light amounts with which the lights will pass through the respective liquid-crystal panels $10_R$, $10_G$, and $10_B$ are controlled, thereby varying the light-and-shade on each pixel basis. Furthermore, the optical images on the each-color-oriented liquid-crystal panels $10_R$, $10_G$, and $10_B$ income into a color-synthesizing cross prism 29 via outgoing-side sheet polarizers $11_R$, $11_G$, and $11_B$, thereby being synthesized with each other. Then, the synthesized optical image is projected on the screen 13 by a projection lens 30, thereby making it possible to acquire a color large-screen image.

Here, as is the case with the first embodiment, the lights on the optical axes of the respective LED elements of the LED light sources $200_R$, $200_G$, and $200_B$ within the each-color-oriented light-source units $100_R$, $100_G$, and $100_B$, on cell lenses of first lens arrays $4_R$, $4_G$, and $4_B$ to which the respective LED elements correspond, are images-formed at positions which have shifted in the right and left directions with reference to the optical axes of the cell lenses. Accordingly, by distributing shift directions of the optical axes of the LED elements uniformly in the right and left directions, it becomes possible to acquire a projection image with the substantially uniform brightness as is the case with the first embodiment.

Also, if the brightnesses in each color on the right and left sides differ from each other because of tolerances of the components or the like, and thus if the luminance unevenness has occurred, the LED light-source driving circuits $400_R$, $400_G$, and $400_B$ light-adjusts the light amounts of the two types of LED elements whose shift directions of the optical axes differ from each other, thereby making it possible to reduce the luminance unevenness. Also, in color unevenness, light-adjustment of the entire light amount of the each-color-oriented LED elements makes it possible to reduce the color unevenness.

Also, in the above-described each-color-oriented LED light sources $200_R$, $200_G$, and $200_B$, collimator lenses $300_R$, $300_G$, and $300_B$, first lens arrays $4_R$, $4_G$, and $4_B$, and second lens arrays $5_R$, $5_G$, and $5_B$, all of these components are set to include the same $m_2$-row×$n_2$-column arrangement. The number of the arrangement, however, may be changed on each color basis, depending on factors such as light-amount difference among the each-color-oriented LED light sources $200_R$, $200_G$, and $200_B$, and white balance.

From the configuration explained so far, the image display device of the present embodiment allows the lights from the light sources to be projected onto the screen with a high efficiency. Accordingly, the image display device allows acquisition of the high-grade color projection image having no luminance unevenness and color unevenness.

[Fourth Embodiment]

Figure 11:
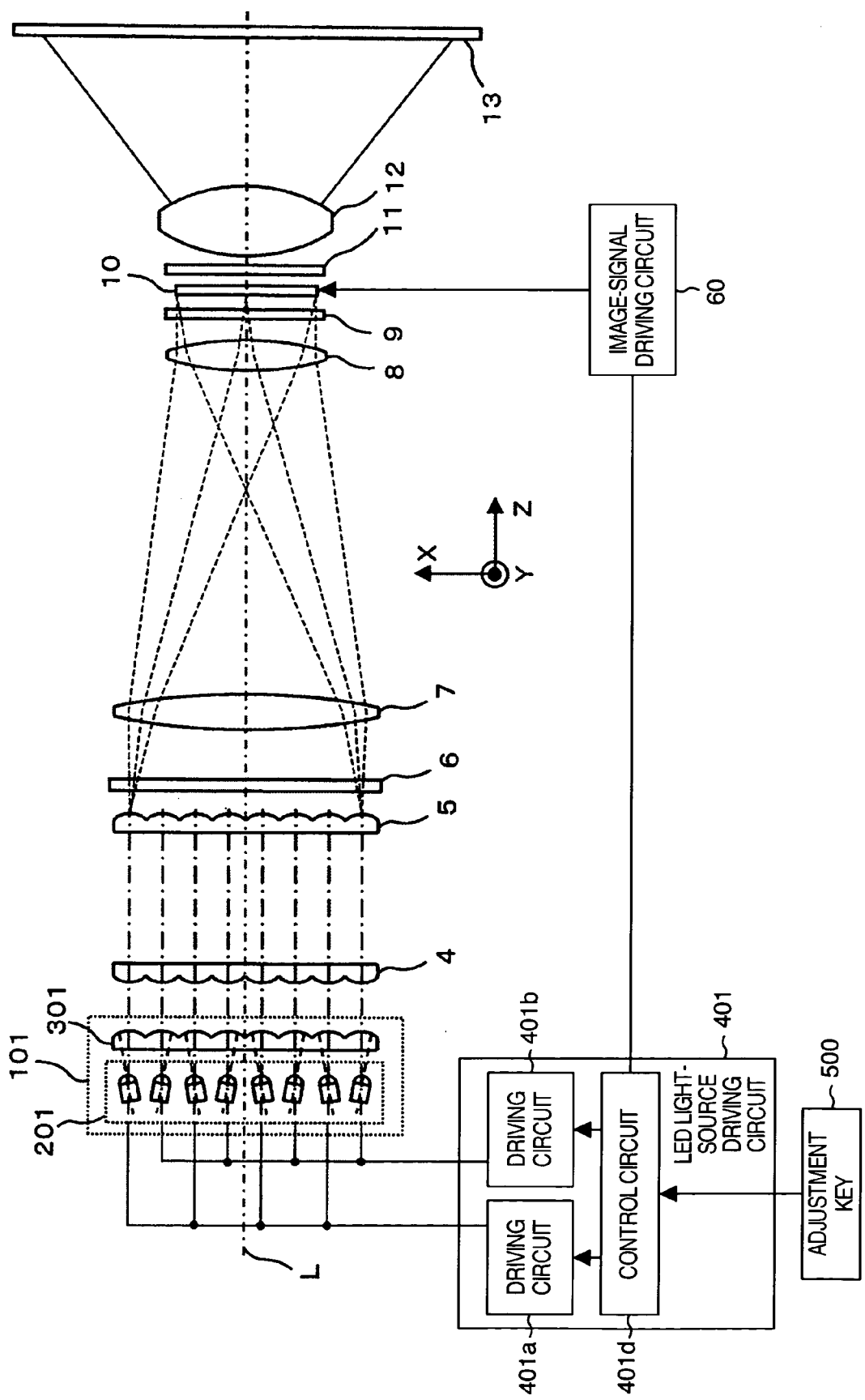
FIG. 11 is a schematic configuration diagram of an image display device of a fourth embodiment according to the present invention.

FIG. 11 is a schematic configuration diagram of an image display device which is a fourth embodiment according to the present invention. The present embodiment is implemented as follows: Namely, one set of a red-oriented LED element for emitting red light, a green-oriented LED element for emitting green light, and a blue-oriented LED element for emitting blue light are defined as a unit. Then, in the first embodiment, the LED light source is configured by locating a plurality of these sets in an array-like manner. Moreover, the respective red-oriented LED element, green-oriented LED element, and blue-oriented LED element in each set are lit up sequentially on time-division basis. Simultaneously, an optical image in response to an image signal is formed on the liquid-crystal panel such that the optical image is made synchronized with the emitted-lights' colors from the respective LED elements. Furthermore, the one set of the red-oriented LED element, the green-oriented LED element, and the blue-oriented LED element are defined as the unit (hereinafter, referred to as "unit LED element"). Then, shift directions of optical axes of the unit LED elements are varied. This causes the lights on the optical axes outgoing from light-emitting centers of the unit LED elements to be illuminated in such a manner that the lights are shifted from the center of the liquid-crystal panel. Next, the shifts are made substantially uniform in the top-to-bottom and right-to-left directions, thereby reducing the luminance unevenness and color unevenness on the liquid-crystal panel.

In FIG. 11, numeral 101 denotes a light-source unit. The light-source unit 101 is configured by a LED light source 201 including the plurality of unit LED elements arranged in an array-like manner ($m_3$ row×$n_3$ column), and a collimator lens 301 including a plurality of cell lenses similarly arranged in an array-like manner ($m_3$ row×$n_3$ column). Numeral 401 denotes a LED light-source driving circuit for driving the LED light source 201, and numeral 60 denotes an image-signal driving circuit for causing an optical image in response to an image signal to be formed on the liquid-crystal panel 10.

In FIG. 11, since configurations and effects of the other components are basically the same as the ones in the first embodiment, the explanation thereof will be omitted here.

Figure 12:
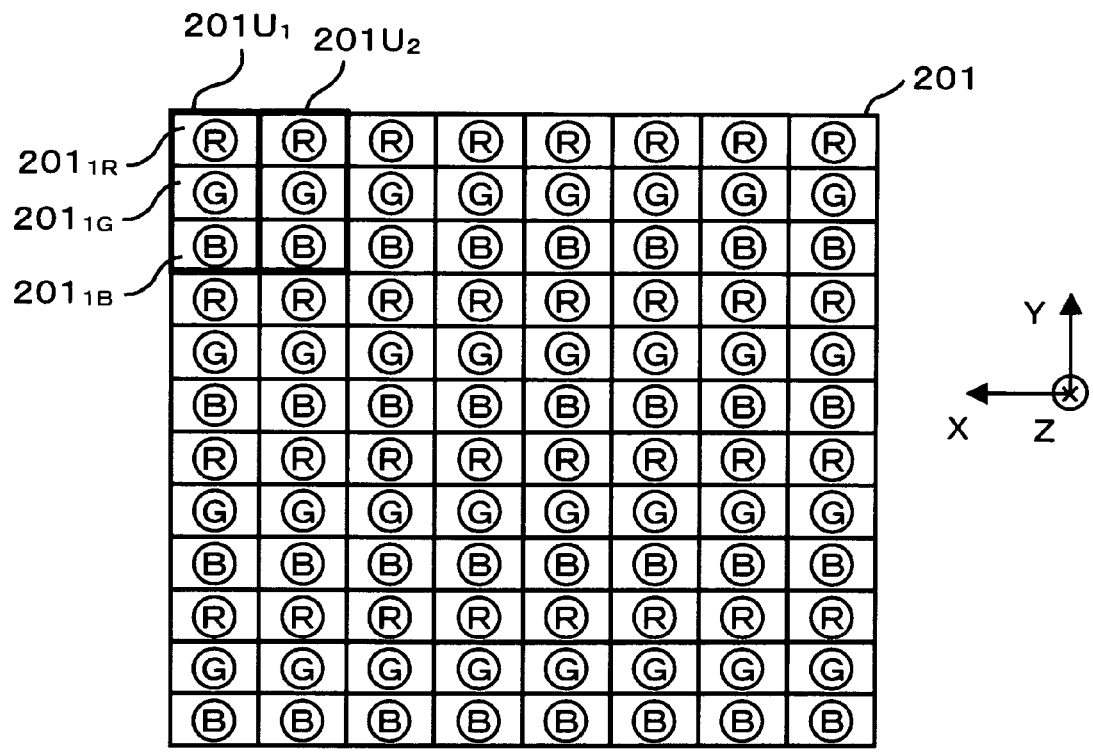
FIG. 12 is a diagram for illustrating an arrangement of LED elements of the fourth embodiment according to the present invention.
Figure 13:
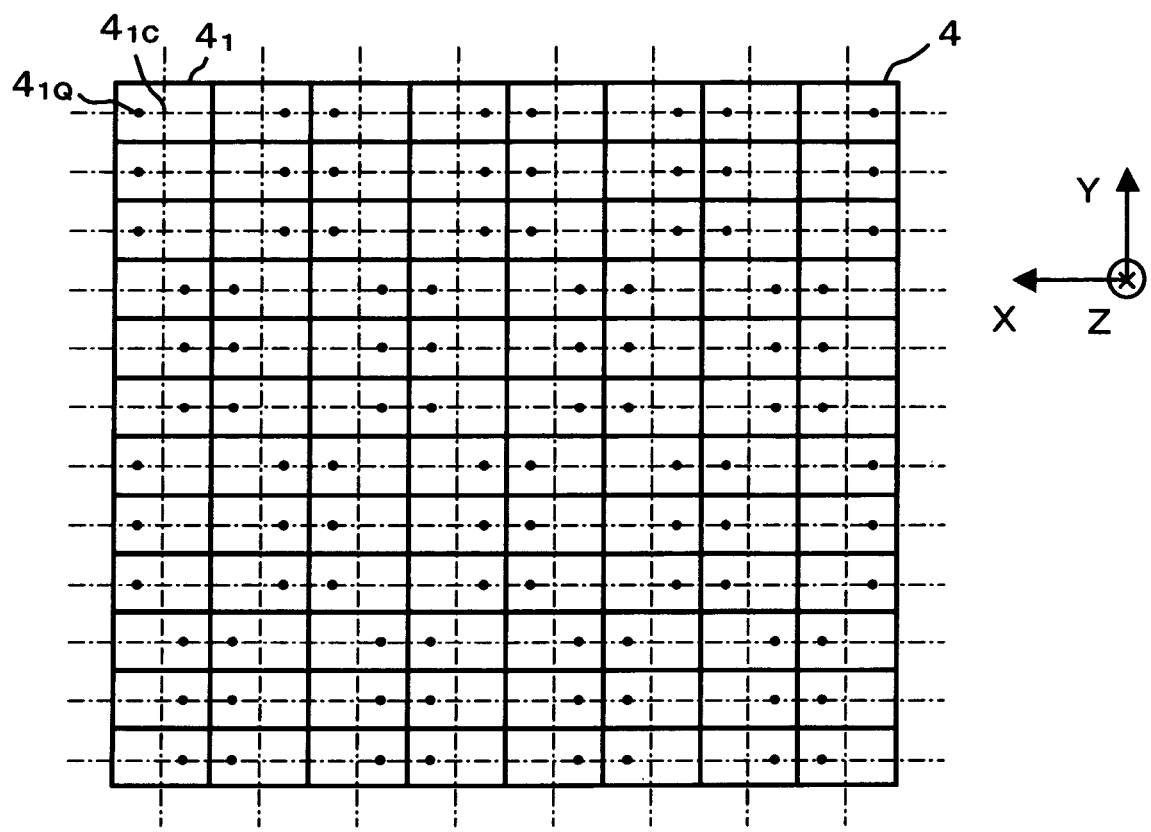
FIG. 13 is a diagram for illustrating shifts of optical axes of the LED elements of the fourth embodiment according to the present invention.

FIG. 12 is a diagram for schematically illustrating one arrangement example of the unit LED elements of the LED light source 201 within the light-source unit 101. FIG. 13 is a diagram for illustrating positions at which the lights on the optical axes outgoing from the light-emitting centers of the respective unit LED elements which configure the LED light source 201 illuminate the respective corresponding cell lens of the first lens array 4. Namely, FIG. 13 is the diagram for illustrating the shifts of the optical axes of the respective unit LED elements on the incoming surface of the first lens array 4.

In FIG. 12, at top-left on the drawing's paper surface, numeral $201_{1R}$ denotes the LED element for emitting red light, numeral $201_{1G}$ denotes the LED element for emitting green light, and numeral $201_{1B}$ denotes the LED element for emitting blue light. As illustrated in FIG. 12, in the LED light source 201, the one set of the three-color-oriented LED elements $201_{1R}$, $201_{1G}$, and $201_{1B}$ are defined as the unit LED element. Furthermore, the plurality of these unit LED elements $201U_i$ (here, U is subscript notation for indicating a unit LED element, and i is subscript notation for indicating an arbitrary unit LED element) are located in a two-dimensional manner.

As is the case with the first embodiment, the respective unit LED elements $201U_i$ are inclined with reference to respective corresponding cell-lens optical axes of the collimator lens 301 at the two types of predetermined angles. Moreover, as illustrated in FIG. 13, the respective LED elements are located such that shift directions of optical axes of the respective LED elements become substantially right-and-left uniform on each unit-LED-element basis. Namely, in row direction (longer-side direction), the shift directions of the optical axes of the unit LED elements $201U_i$ become inverted to each other alternately. Also, in column direction (shorter-side direction), the shift directions of the optical axes of the unit LED elements $201U_i$ become inverted to each other alternately. Consequently, as are the above-described cases with the first to third embodiments, it becomes possible to reduce the luminance unevenness and color unevenness on the liquid-crystal panel (i.e., on the screen).

Figure 14:
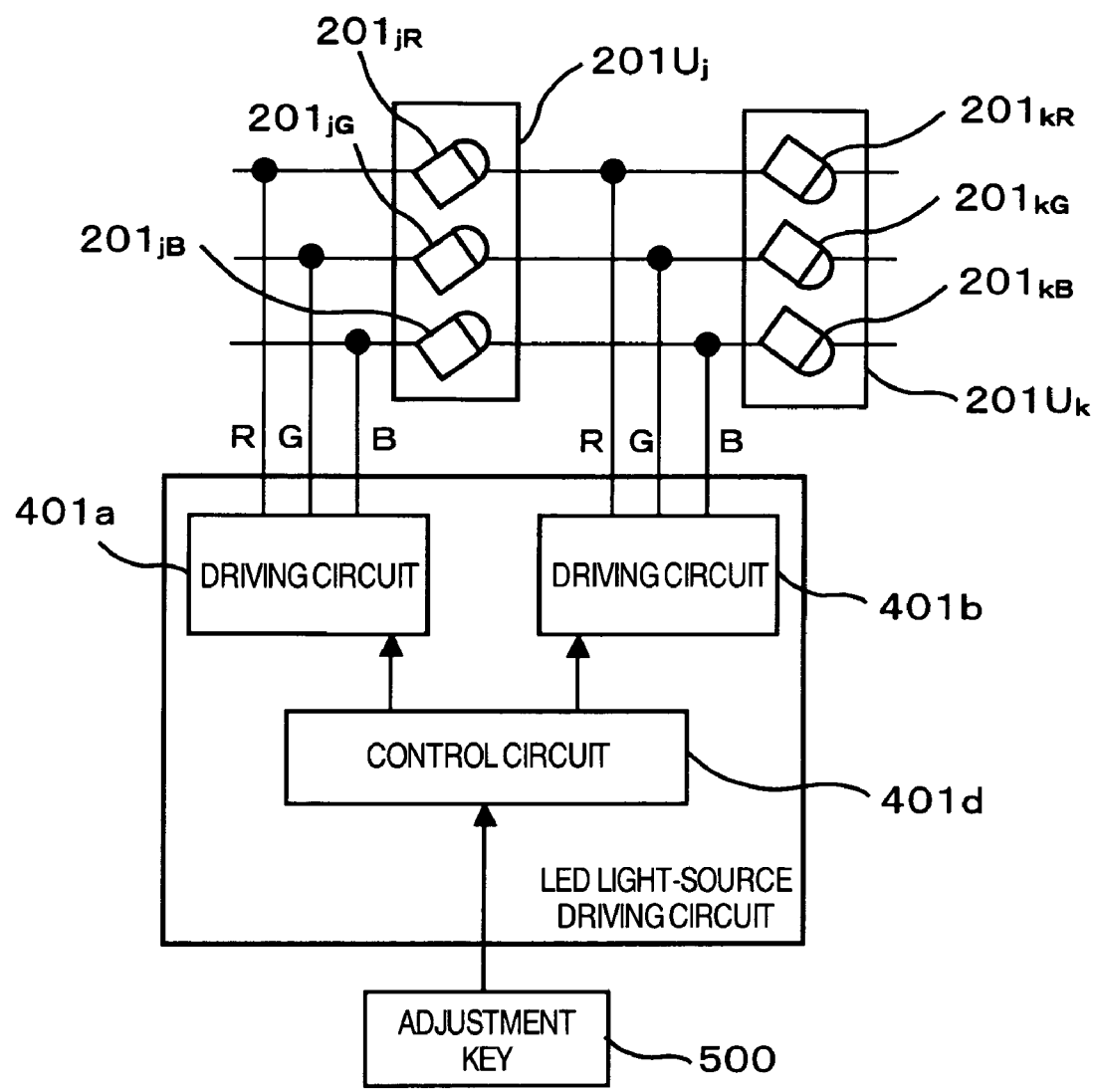
FIG. 14 is a diagram for illustrating a LED light-source driving circuit of the fourth embodiment according to the present invention.

Of the unit LED elements $201U_i$ inclined at the two types of predetermined angles, as illustrated in FIG. 14, the unit LED elements within a group of the unit LED elements $201U_j$ ($201_{jR}$, $201_{jG}$, and $201_{jB}$) inclined at the one type of predetermined angle are connected to each other on each color basis, and are driven by a driving circuit 401a of a LED light-source driving circuit 401. Similarly, the unit LED elements within a group of the unit LED elements $201U_k$ ($201_{kR}$, $201_{kG}$, and $201_{kB}$) inclined at the other type of predetermined angle are also connected to each other on each color basis, and are driven by a driving circuit 401b of the LED light-source driving circuit 401 independently of the unit LED elements $201U_j$. Also, the respective driving circuits 401a and 401b are configured to be able to light-adjust light amounts of red, green, and blue independently of each other.

Incidentally, numeral 401d in the LED light-source driving circuit 401 denotes a control circuit for controlling the driving circuits 401a and 401b. Based on an operation input via an adjustment key 500 which is operable from the outside, the control circuit 401d controls the driving circuits 401a and 401b so that, on each color basis and in correspondence with the inclination angles of the optical axes, brightness of the unit LED elements $201U_j$ and that of the unit LED elements $201U_k$ are made variable independently of each other.

Furthermore, the control circuit 401d in the LED light-source driving circuit 401 controls the respective driving circuits 401a and 401b, thereby switching the three-color-oriented unit LED elements $201U_i$ ($201_{iR}$, $201_{iG}$, and $201_{iB}$) sequentially on time-division basis so as to cause the unit LED elements $201U_i$ to emit the three-color lights.

On the liquid-crystal panel 10, an image-signal driving circuit 60 performs the following light intensity modulation, thereby forming an optical image: Namely, in the light intensity modulation, light amount with which the lights will pass through the liquid-crystal panel 10 is controlled, thereby varying the light-and-shade on each pixel basis. At this time, the control circuit 401d in the LED light-source driving circuit 401 controls the image-signal driving circuit 60 such that the driving circuit is made synchronized with color of emitted light from a unit LED element, and forms the optical image of an image signal corresponding to the emitted-light' color.

As described above, switching the unit LED elements $201_{iR}$, $201_{iG}$, and $201_{iB}$ is performed at the high speed. Moreover, on the liquid-crystal panel 10, the control is performed such that the each-color-oriented optical images are formed in synchronization with the respective colors of the unit LED elements. This control allows the three-color images projected onto the screen 13 to be switched at the high speed and to be mixed on eyes' retinas of a person who watches the picture. This causes the mixed images to be recognized as an arbitrary color, thereby making it possible to implement display of the color image.

Next, the explanation will be given below concerning a reduction in the luminance unevenness and color unevenness according to the present embodiment. As illustrated in FIG. 13, the respective LED elements are located such that the shift directions of the optical axes of the respective LED elements become substantially right-and-left uniform on each unit-LED-element basis. Consequently, as are the above-described cases with the first to third embodiments, it becomes possible to reduce the luminance unevenness and color unevenness on the liquid-crystal panel (i.e., on the screen). Also, concerning the case where the brightnesses on the right and left sides differ from each other on the liquid-crystal panel (i.e., on the screen) because of tolerances of the components or the like, and thus the luminance unevenness has occurred, the LED light-source driving circuit 401 light-adjusts light amounts of the groups of the unit LED elements independently of each other. Here, in the groups of the unit LED elements, their inclination angles with reference to the cell-lens optical axes of the collimator lens 301 differ from each other, and their resultant shift directions of the optical axes differ from each other. This makes it possible to reduce the luminance unevenness. Also, in the color unevenness, making independent light-adjustment of the entire light amount of the each-color-oriented respective LED elements makes it possible to reduce the color unevenness. This is because the respective driving circuits 401a and 401b are configured to be able to light-adjust the light amounts of the each-color-oriented respective LED elements of red, green, and blue independently of each other.

Also, in the above-described light-source unit 101, the red-oriented LED elements, the green-oriented LED elements, and the blue-oriented LED elements have been made equal in number. The number of the each-color-oriented unit LED elements $201_{iR}$, $201_{iG}$, and $201_{iB}$, however, may be changed, depending on light-amount difference and luminous-efficiency difference among the each-color-oriented unit LED elements $201_{iR}$, $201_{iG}$, and $201_{iB}$.

From the configuration explained so far, the image display device of the present embodiment allows the lights from the light sources to be projected onto the screen with a high efficiency. Accordingly, the image display device allows acquisition of the high-grade color projection image having no luminance unevenness and color unevenness. Moreover, it becomes possible to provide a compact and low-cost image display device to the third embodiment. This is because the use of only one liquid-crystal panel, which is an expensive component, allows implementation of the color display.

In the explanation of the present embodiment, the configuration explained in the first embodiment has been employed as the basic configuration of the LED light-source unit. The present invention, however, is not limited thereto. Namely, it is needless to say that, for example, the basic configuration of the LED light-source unit explained in the second embodiment may be employed. Also, it is needless to say that, although, in the present embodiment, the LED light-source driving circuit has been provided on each unit-LED-element basis, the LED light-source driving circuit may be provided on each plural-unit-LED-element basis.

[Fifth Embodiment]

Figure 15:
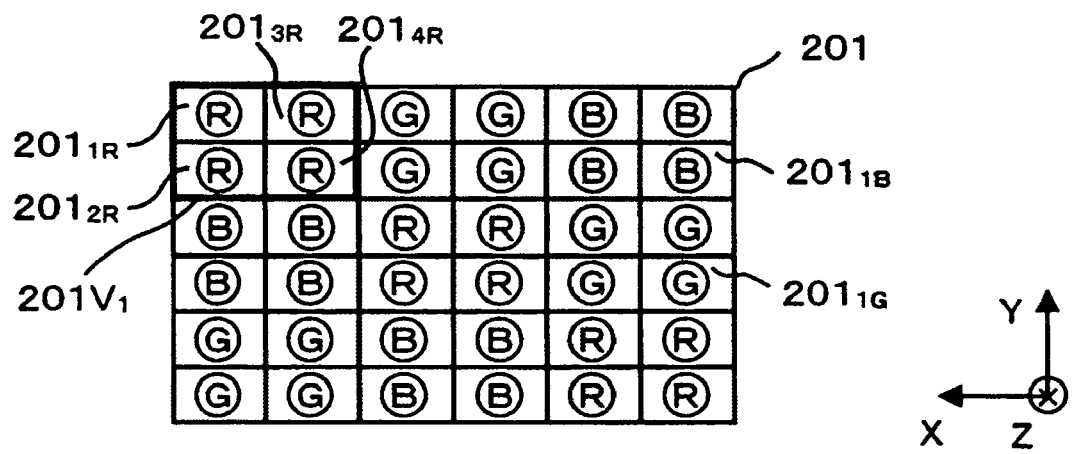
FIG. 15 is a diagram for illustrating an arrangement of LED elements of a fifth embodiment according to the present invention.

FIG. 15 is a diagram for schematically illustrating one arrangement example of a LED light source within a light-source unit which is a fifth embodiment according to the present invention. As is the case with FIG. 5, FIG. 16 is a diagram for illustrating positions at which lights on optical axes outgoing from light-emitting centers of respective LED elements illuminate respective cell lens of the first lens array 4.

In the present embodiment, a plurality of (in the present embodiment, e.g., four) LED elements for one and the same color are defined as a unit. Then, the LED light source is configured by locating a plurality of these sets in an array-like manner. Moreover, the respective red-oriented LED element, green-oriented LED element, and blue-oriented LED element in each set are lit up sequentially on time-division basis. Simultaneously, an optical image in response to an image signal is formed on the liquid-crystal panel such that the optical image is made synchronized with the emitted-lights' colors from the respective LED elements. Furthermore, this one set of plurality of same-color-directed LED elements (hereinafter, referred to as "same-color unit LED element") is caused to illuminate the lights onto a single cell lens of the first lens array 4 in such a manner that the lights are shifted from center of the liquid-crystal panel. Next, the shifts are made substantially uniform in every direction, thereby reducing the color unevenness on the liquid-crystal panel.

In FIG. 15, the light-source unit is configured by a LED light source 201 including the plurality of LED elements arranged in an array-like manner ($a_3$ row×$b_3$ column), and a collimator lens (not illustrated) including a plurality of cell lenses similarly arranged in an array-like manner ($a_3$ row×$b_3$ column). In addition, numeral $201_{1R}$ denotes the LED element for emitting red light, numeral $201_{1G}$ denotes the LED element for emitting green light, and numeral $201_{1B}$ denotes the LED element for emitting blue light. As illustrated in FIG. 15, in the LED light source 201, one set of LED elements $201_{1R}$, $201_{2R}$, $201_{3R}$, and $201_{4R}$ are defined as the same-color unit LED element (boldface frame). Furthermore, the plurality of these same-color unit LED elements $201V_i$ (here, V is subscript notation for indicating a same-color unit LED element, and i is subscript notation for indicating an arbitrary same-color unit LED element) are located in a two-dimensional manner.

Figure 16:
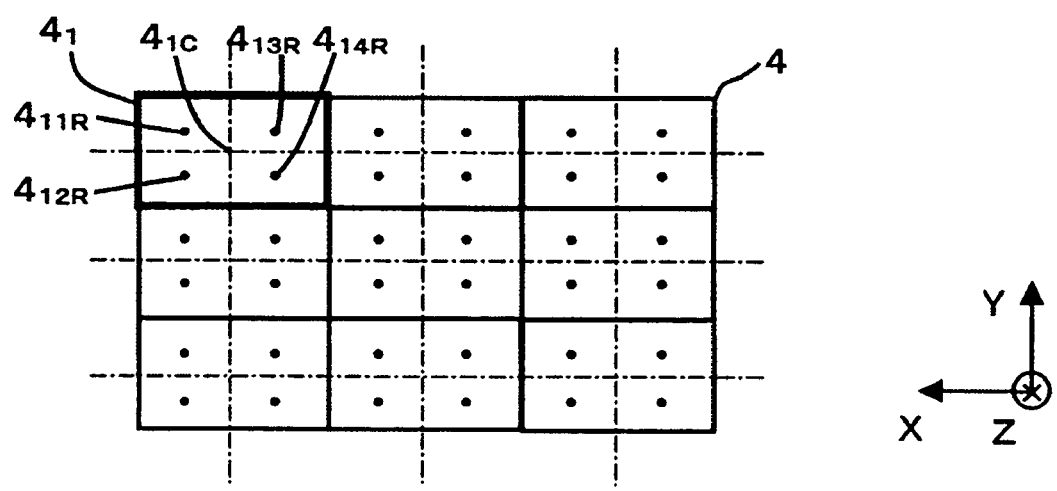
FIG. 16 is a diagram for illustrating shifts of optical axes of the LED elements of the fifth embodiment according to the present invention.

In FIG. 16, in the first lens array 4, numeral of the cell lens at top-left on the first line (longer-side direction) is defined as $4_1$. Then, $4_{1C}$ is the center of the cell lens $4_1$, and $4_{11R}$, $4_{12R}$, $4_{13R}$, and $4_{14R}$ of the black-circle point are the points onto which the light on the optical axis outgoing from the light-emitting center of the LED element $200_1$ is illuminated. Moreover, arranging the LED elements just as illustrated in FIG. 15 allows the shift directions of the optical axes of the LED elements to be made substantially uniform in every direction, thereby making it possible to reduce the color unevenness. In addition, this arrangement results in an advantage of making it easy to arrange the LED elements.

[Sixth Embodiment]

Figure 17:
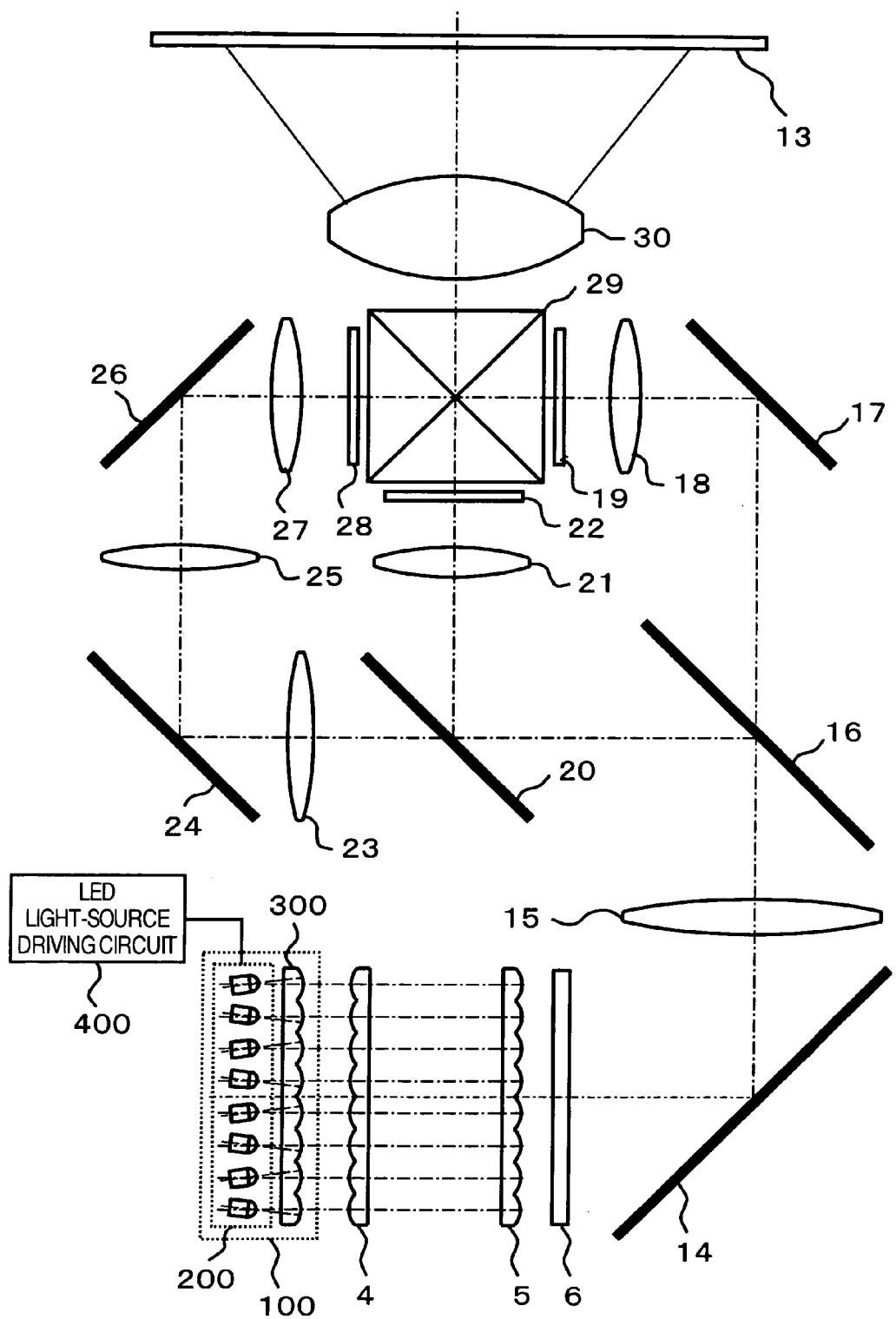
FIG. 17 is a schematic configuration diagram of an image display device of a sixth embodiment according to the present invention.

FIG. 17 is a schematic configuration diagram of an image display device which is a sixth embodiment according to the present invention. In the present embodiment, the light-source unit employed in the first embodiment is employed as an example of the light-source unit. Of course, it is needless to say that the light-source unit employed in the second embodiment may be employed.

In FIG. 17, numerals 19, 22, and 28 denote transparent-type liquid-crystal panels, i.e., image display elements which correspond to three primary-colors of R, G, and B respectively. With respect to light-flux emitted from the light-source unit 100, a not-illustrated image-signal driving circuit performs light intensity modulation in response to an image signal, thereby forming optical images on the liquid-crystal panels. Here, the reference numerals denote the following components, respectively: 14, a mirror, 15, a light-converging lens, 16, 20 dichroic mirrors for color separation, 23 a first relay lens, 25 a second relay lens, 27 a third relay lens, 17, 24, 26 mirrors, 18, 21 condenser lenses, 29 a color-synthesizing cross prism, 30 a projection lens, 13 a screen. Also, as a main component other than these, there exists a not-illustrated power-supply circuit.

The white light emitted from the light-source unit 100 is made uniform by a first lens array 4 and a second lens array 5 which configure an integrator optical system, then being projected onto the liquid-crystal panels 19, 22, and 28. At this time, projection images on respective cell lenses of the first lens array 4 are superimposed with each other on the red (R)-oriented liquid-crystal panel 19, green (G)-oriented liquid-crystal panel 22, and blue (B)-oriented liquid-crystal panel 28 by the light-converging lens 15, the condenser lenses 18 and 21, the first relay lens 23, the second relay lens 25, and the third relay lens 27.

In this process, by the dichroic mirrors 16 and 20 which configure a color-separating member, the white light emitted from the light-source unit 100 is separated into color lights of the R, G, and B three primary-colors, then being illuminated onto the liquid-crystal panels 19, 22, and 28 which correspond thereto respectively. Incidentally, here, the dichroic mirror 16 exhibits a red-transparent and green-blue-reflective characteristic, and the dichroic mirror 20 exhibits a blue-transparent and green-reflective characteristic.

On the respective liquid-crystal panels 19, 22, and 28, a not-illustrated incoming-side sheet polarizer and the not-illustrated image-signal driving circuit perform the light intensity modulation, thereby forming the respective optical images: Namely, in the light intensity modulation, light amounts with which the lights will pass through the respective liquid-crystal panels are controlled, thereby varying the light-and-shade on each pixel basis.

Moreover, the respective optical images brightly illuminated on the liquid-crystal panels 19, 22, and 28 are color-synthesized by the cross prism 29. Furthermore, the color-synthesized optical image is projected onto the screen 13 by the projection lens 30, thereby making it possible to acquire a large-screen image.

Also, the first relay lens 23, the second relay lens 25, and the third relay lens 27 compensate for the condition that the optical-path length of the liquid-crystal panel 28 is longer as compared with those of the liquid-crystal panels 19 and 22.

From the configuration explained so far, the image display device of the present embodiment allows the lights from the light sources to be projected onto the screen with a high efficiency. Moreover, as components other than the light-source unit 100, components of a liquid-crystal projector using high-pressure mercury lamp or the like can be diverted just as they are. This makes it possible to implement the components without necessitating large-scale equipment investment or the like.

Although, in the present embodiment, the white-color-oriented LED elements have been employed, the R. G, and B three-color-oriented LED elements may also be employed as are the cases with the fourth to fifth embodiments. In this case, there exists no necessity for switching light-emitting of the R, G, and B LED elements, and the R. G, and B LED elements may be lit up all the time.

[Seventh Embodiment]

Figure 18:
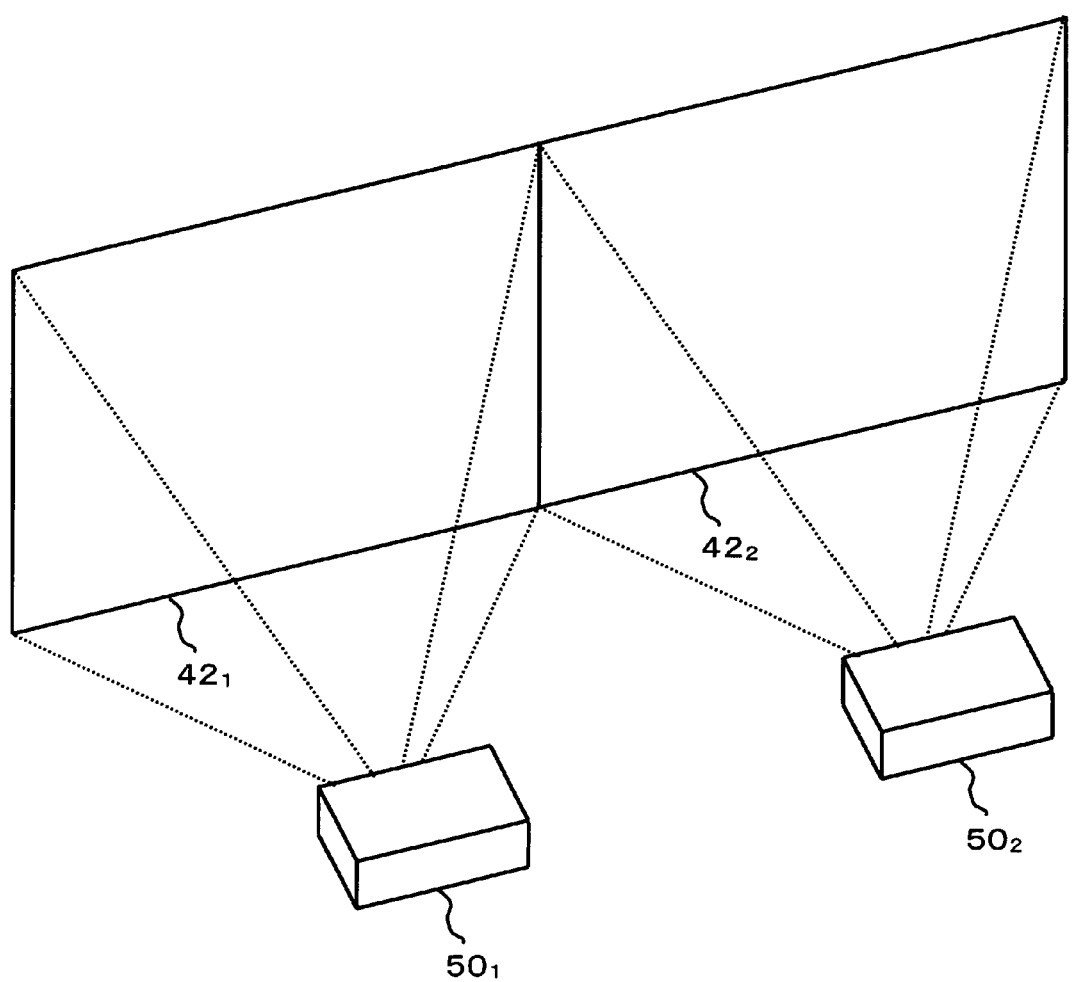
FIG. 18 is a schematic configuration diagram of an image display device of a seventh embodiment according to the present invention.

FIG. 18 is a schematic configuration diagram of an image display device which is a seventh embodiment according to the present invention. In FIG. 18, numerals $50_1$ and $50_2$ denote the image display devices of the above-described first to sixth embodiments according to the present invention. Here, respective projection images $42_1$ and $42_2$ resulting therefrom are connected to each other in the right-to-left directions, thereby allowing large-screen implementation.

In the image display devices of the above-described first to sixth embodiments according to the present invention, the lights on the optical axes outgoing from the light-emitting centers of the respective LED elements which configure the LED light source can be illuminated and superimposed in such a manner that the lights are shifted from the central point of the liquid-crystal panel, i.e., the central point of the screen, onto the right and left sides. Namely, on the screen (liquid-crystal panel), there are provided the plurality of groups including the points onto which the lights on the optical axes of the respective LED elements are illuminated. Moreover, the illuminated points are made substantially symmetric to each other with reference to the central point of the screen (liquid-crystal panel). Simultaneously, the total light amounts of the respective groups are made substantially equal. This configuration reduces the nonuniformities of the luminance (brightness) on the screen (liquid-crystal panel). Furthermore, even if the luminance unevenness and color unevenness have occurred due to, e.g., variations in the components or the like, the configuration is given such that the respective LED-element groups corresponding to the respective illuminated points can be driven independently of each other by the LED light-source driving circuit. This makes it possible to change light-emitting amounts of the respective LED-element groups, thereby allowing light-adjustment of the brightness (luminance) and colors, and allowing reduction in the luminance unevenness and color unevenness.

Consequently, even if the luminance unevenness or color unevenness exists within the respective projection images, it becomes possible to reduce the luminance unevenness or color unevenness within the respective projection images. Also, if the luminance unevenness or color unevenness exists between the projection image $42_1$ and the projection image $42_2$, it becomes possible to reduce the luminance unevenness or color unevenness by changing light-emitting amounts of respective LED light sources of the first image display device $50_1$ and the second image display device $50_2$. At this time, unlike the light-emitting tube used as the light source conventionally, it becomes possible to keep the balance by increasing the light-emitting amount of the LED light source on a darker projection-image side.

Also, if the luminance unevenness or color unevenness exists at the seam portion between the projection image $42_1$ and the projection image $42_2$, the respective LED light-source driving circuits make the adjustment so that the luminance and color on the right side of the first image display device $50_1$ and the ones on the left side of the second image display device $50_2$ will coincide with each other. This adjustment makes inconspicuous the seam portion between the two projection images $42_1$ and $42_2$, thereby allowing acquisition of the high-grade and large-screen image.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display device, comprising:
   a light source including a plurality of semiconductor light-emitting elements,
   parallelizing means including a plurality of cell lenses arranged in a one-to-one correspondence with each of said plurality of semiconductor light-emitting elements,
   an image display element for forming an optical image,
   a pair of lens-array groups located between said parallelizing means and said image display element, and
   projection means for enlarging and projecting said optical image formed on said image display element, wherein
   said plurality of semiconductor light-emitting elements are located at substantially focal points of said cell lenses of said parallelizing means, and there exist at least two types of semiconductor light-emitting elements' groups, light beams on optical axes of said semiconductor light-emitting elements belonging to said two types of semiconductor light-emitting elements' groups existing on straight lines which are different from optical axes of said lens-array groups.

2. The image display device according to claim 1, wherein said light source is configured such that said semiconductor light-emitting elements belonging to said respective semiconductor light-emitting elements' groups are substantially equal to each other in number.

3. The image display device according to claim 2, wherein said optical axes of said respective semiconductor light-emitting elements belonging to said respective semiconductor light-emitting elements' groups intersect with each other at predetermined angles which are substantially symmetric to each other with reference to optical axes of said parallelizing means corresponding to said respective semiconductor light-emitting elements.

4. The image display device according to claim 2, wherein
   said optical axes of said respective semiconductor light-emitting elements belonging to said respective semiconductor light-emitting elements' groups substantially coincide with optical axes of said parallelizing means corresponding to said respective semiconductor light-emitting elements,
   said optical axes of said parallelizing means existing on straight lines which are substantially parallel to and are different from said optical axes of said lens-array groups corresponding to said respective semiconductor light-emitting elements.

5. The image display device according to claim 3, further comprising light-emitting control means for controlling light-emitting amounts of said semiconductor light-emitting elements' groups with respect to each of said semiconductor light-emitting elements' groups.

6. The image display device according to claim 4, further comprising light-emitting control means for controlling light-emitting amounts of said semiconductor light-emitting elements' groups with respect to each of said semiconductor light-emitting elements' groups.

7. The image display device according to claim 4, wherein said light source includes said plurality of semiconductor light-emitting elements which comprise semiconductor light-emitting elements for at least R color, G color, and B color.

8. The image display device according to claim 5, wherein said light source includes said plurality of semiconductor light-emitting elements which comprise semiconductor light-emitting elements for at least R color, G color, and B color.

9. The image display device according to claim 6, wherein said light source includes said plurality of semiconductor light-emitting elements which comprise semiconductor light-emitting elements for at least R color, G color, and B color.

10. The image display device according to claim 7, wherein said respective semiconductor light-emitting elements for R color, G color, and B color are substantially equal to each other in number.

11. The image display device according to claim 8, wherein said respective semiconductor light-emitting elements for R color, G color, and B color are substantially equal to each other in number.

12. The image display device according to claim 9, wherein said respective semiconductor light-emitting elements for R color, G color, and B color are substantially equal to each other in number.

13. The image display device according to claim 7, wherein said respective semiconductor light-emitting elements for R color, G color, and B color are different from each other in number.

14. The image display device according to claim 8, wherein said respective semiconductor light-emitting elements for R color, G color, and B color are different from each other in number.

15. An image display device, comprising:
a light source including a plurality of sets each of which includes a plurality of semiconductor light-emitting elements,
parallelizing means including a plurality of cell lenses arranged in a one-to-one correspondence with each of said plurality of semiconductor light-emitting elements,
an image display element for forming an optical image,
a pair of lens-array groups located between said parallelizing means and said image display element, and
projection means for enlarging and projecting said optical image formed on said image display element, wherein
said plurality of semiconductor light-emitting elements are located at substantially focal points of said cell lenses of said parallelizing means, at least two of light beams on optical axes of said respective semiconductor light-emitting elements belonging to each of said sets existing on straight lines which are different from optical axes of said lens-array groups.

16. The image display device according to claim 15, wherein each of said sets includes said semiconductor light-emitting elements for one and the same color.

17. The image display device according to claim 16, wherein said light source includes said sets for at least R color, G color, and B color.

18. The image display device according to claim 17, wherein said sets for R color, G color, and B color are substantially equal to each other in number.

19. The image display device according to claim 17, wherein said sets for R color, G color, and B color are different from each other in number.

* * * * *